(12) United States Patent
Tsafrir et al.

(10) Patent No.: US 8,261,283 B2
(45) Date of Patent: Sep. 4, 2012

(54) SYSTEM AND METHOD FOR BACKFILLING WITH SYSTEM-GENERATED PREDICTIONS RATHER THAN USER RUNTIME ESTIMATES

(75) Inventors: Dan Tsafrir, Rehovot (IL); Yoav Etsion, Jerusalem (IL); Dror Feitelson, Jerusalem (IL); David Talby, Tel Aviv (IL)

(73) Assignee: Yissum Research Development Company of Hebrew University of Jerusalem, Jerusalem (IL)

( * ) Notice: Subject to any disclaimer, the term of this patent is extended or adjusted under 35 U.S.C. 154(b) by 1269 days.

(21) Appl. No.: 11/884,024

(22) PCT Filed: Feb. 15, 2006

(86) PCT No.: PCT/IL2006/000199
§ 371 (c)(1),
(2), (4) Date: Jan. 15, 2008

(87) PCT Pub. No.: WO2006/087713
PCT Pub. Date: Aug. 24, 2006

(65) Prior Publication Data
US 2008/0155550 A1 Jun. 26, 2008

Related U.S. Application Data

(60) Provisional application No. 60/653,110, filed on Feb. 16, 2005.

(51) Int. Cl.
*G06F 9/46* (2006.01)

(52) U.S. Cl. ...................................... 718/107

(58) Field of Classification Search .................. 718/102, 718/107
See application file for complete search history.

(56) References Cited

U.S. PATENT DOCUMENTS
6,359,416 B1 * 3/2002 Rao et al. ...................... 318/727

OTHER PUBLICATIONS

Srividya Srinivasan, Rajkumar Kettimuthu, Vijay Subramani, P. Sadayappan, Characterization of Backfilling Strategies for Parallel Job Scheduling, 2002, Proceedings of the International Conference on Parallel Processing Workshops, pp. 514-519.*

Mu'alem et al., "Utilization, Predictability, Workloads, and User Runtime Estimates n Scheduling the IBM SP2 with Backfilling", IEEE Transactions on Parallel and Distributed Systems, vol. 12, No. 6, Jun. 2001.

(Continued)

*Primary Examiner* — Meng An
*Assistant Examiner* — Blake Kumabe
(74) *Attorney, Agent, or Firm* — Dorsey & Whitney LLP

(57) ABSTRACT

A system and method for performing backfilling on an incoming flow of incoming parallel programs provided by a population of clients to a facility, the system comprising a computer-controlled prediction functionality operative to generate a current run-time prediction for at least some of the incoming parallel programs, a backfiller performing backfilling on the incoming flow of incoming parallel programs based at least partly on at least some of the run-time predictions; and a prediction updater operative, if the current run-time of an incoming parallel program currently in process exceeds the current run-time prediction, to generate an updated run-time prediction to exceed the current run-time, to re-define the current run time to equal the updated run-time prediction, thereby to allow the backfiller to continue performing backfilling based on the updated run-time prediction.

32 Claims, 14 Drawing Sheets

OTHER PUBLICATIONS

Lawson et al., "Multiple-Queue Backfilling Scheduling with Priorities and Reservations for Parallel Systems", This work was partially supported by the National Science Foundation under grants EIA-9977030, EIA-9974992, CCR-0098278, and ACI-0090221, Springer-Verlag Berlin Heidelberg 2002.

Downey, "Predicting Queue Times on Space-Sharing Parallel Computers", 1997 IEEE.

Krishnaswamy et al., "Estimating Computation Times of Data-Intensive Applications", IEEE Distributed Systems Online 1541-4922 © 2004 Published by the IEEE Computer Society, vol. 5, No. 4, Apr. 2004.

Chiang et al., The Impact of More Accurate Requested Runtimes on Production Job Scheduling Performance, Computer Sciences Department, University of Wisconsin, circa 2001.

Smith et al., "Predicting Application Run Times Using Historical Information", Mathematics and Computer Science Division, Argonne National Laboratory and Electrical and Computer Engineering Department, Northwestern University circa 1998.

International Search Report mailed Nov. 22, 2006.

Written Opinion dated Nov. 22, 2006.

Smith et al.: "Using run-time predictions to estimate queue wait times and improve scheduler performance," Job Scheduling Strategies for Parallel Processing, IPPS/SPDP '99 Worship, JSSPP '99, Berlin, Germany, pp. 202-219.

Gibbons R: "A historical application profiler for use by parallel schedulers," Job Scheduling Strategies for Parallel Processing, IPPS '97, Berlin, Germany, pp. 58-77.

D. Tsafrier et al.: "Backfilling Using System-Generated Predictions Rather Than User Runtime Estimates," Technical Report, Feb. 2005, pp. 1-32.

* cited by examiner

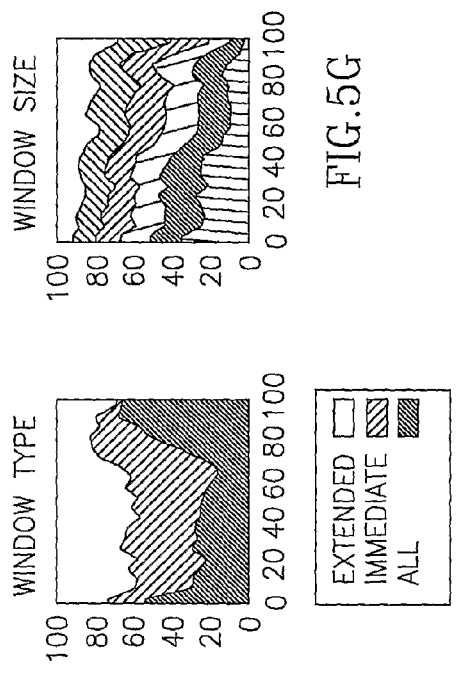
FIG.5A
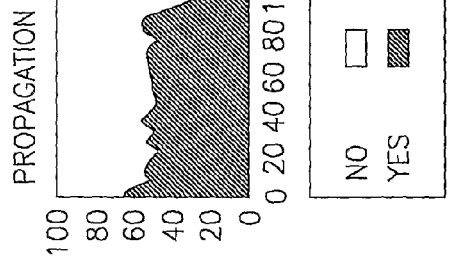
FIG.5C
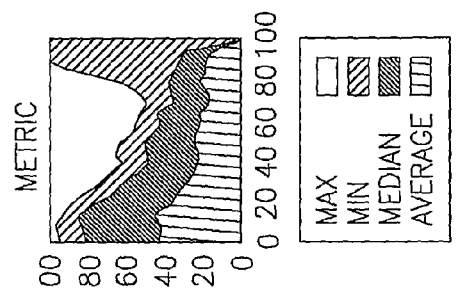
FIG.5E
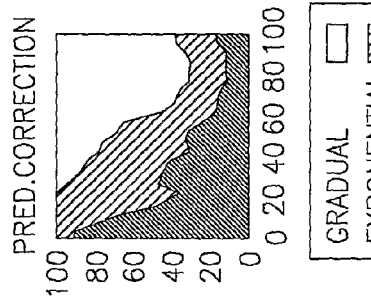
FIG.5G
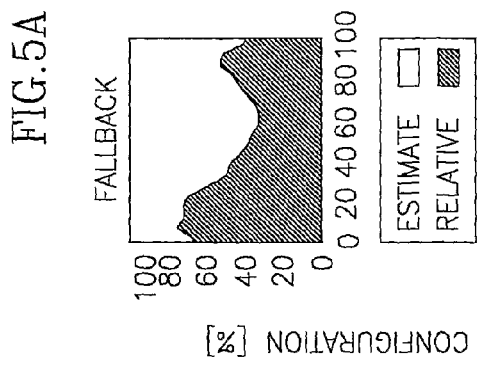
FIG.5B
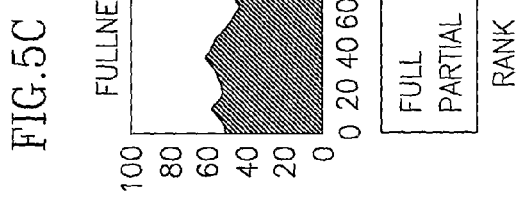
FIG.5D
FIG.5F

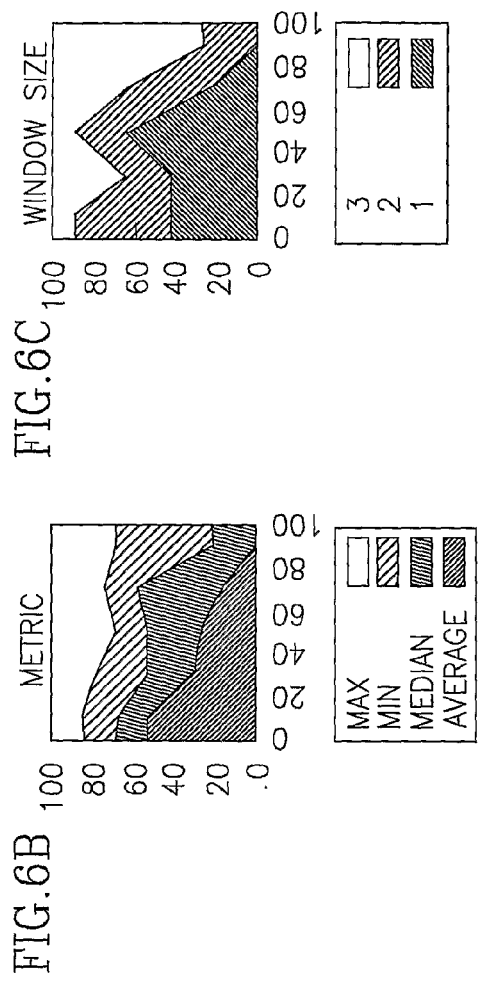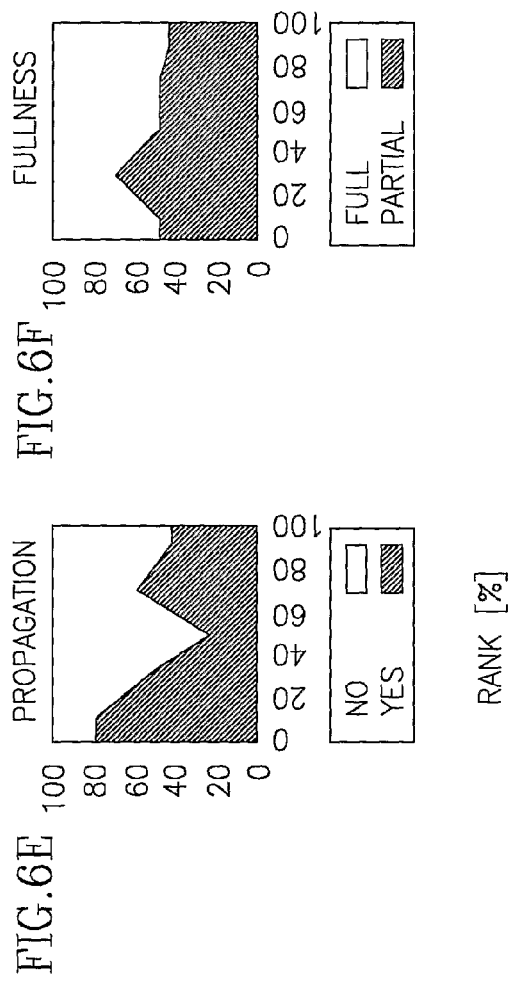

SYSTEM AND METHOD FOR BACKFILLING WITH SYSTEM-GENERATED PREDICTIONS RATHER THAN USER RUNTIME ESTIMATES

This application is the U.S. national phase of International Application No. PCT/IL2006/000199 filed 15 Feb. 2006 which designated the U.S. and claims priority to U.S. Provisional Application No. 60/653,110 filed 16 Feb. 2005, the entire contents of each of which are hereby incorporated by reference.

FIELD OF THE INVENTION

The present invention relates generally to job scheduling of parallel computers and specifically to job scheduling of parallel computers using backfilling.

BACKGROUND OF THE INVENTION

The state of the art is believed to: be represented by the following publications:

S-H. Chiang, A. Arpaci-Dusseau, and M. K. Vernon, "The impact of more accurate requested runtimes on production job scheduling performance". In Job Scheduling Strategies for Parallel Processing, pp. 103-127, Springer Verlag, 2002. LNCS 2537.

A. B. Downey, "Predicting queue times on space-sharing parallel computers". In 11th Intl. Parallel Processing Symp., pp. 209-218, April 1997.

R. Gibbons, "A historical application profiler for use by parallel schedulers". In Job Scheduling Strategies for Parallel Processing, pp. 58-77, Springer Verlag, 1997. LNCS 1291.

B. G. Lawson and E. Smirni, "Multiple-queue backfilling scheduling with priorities and reservations for parallel systems". In Job Scheduling Strategies for Parallel Processing, pp. 72-87, Springer Verlag, July 2002. LNCS 2537.

A. W. Mu'alem and D. G. Feitelson, "Utilization, predictability, workloads, and user runtime estimates in scheduling the IBM SP2 with backfilling". IEEE Trans. Parallel & Distributed Syst. 12(6), pp. 529-543, June 2001.

W. Smith, I. Foster, and V. Taylor, "Predicting application run times using historical information". In Job Scheduling Strategies for Parallel Processing, pp. 122-142, Springer Verlag, 1998. LNCS 1459.

W. Smith, V. Taylor, and I. Foster, "Using run-time predictions to estimate queue wait times and improve scheduler performance". In Job Scheduling Strategies for Parallel Processing, pp. 202-219, Springer Verlag, 1999. LNCS 1659.

Shonali Krishnaswamy et al, "Estimating Computation Times of Data-Intensive Applications", IEEE Distributed Systems online, April 2004 (Vol. 5, No. 4).

The disclosures of all publications mentioned in the specification, and of the publications cited therein directly or indirectly, are hereby incorporated by reference.

SUMMARY OF THE INVENTION

The present invention seeks to provide an improved system and method for parallel and grid job scheduling using backfilling that is based on system-generated runtime predictions, instead of user runtime estimates.

Evaluation of the scheduling schemes shown and described herein may be based on an event-based simulator. Upon arrival, the scheduler is informed of the number of processors the job needs and its estimated runtime. The scheduler can then start the job's simulated execution or place it in a queue. Upon a job termination, the scheduler is notified and can schedule other queued jobs on the free processors. Job runtimes are part of the simulation input, but are not given to the scheduler.

The following table A lists the traces used to drive simulations. The first three traces are from machines using the EASY scheduler. The fourth (SDSC BlueHorizon) uses the LoadLeveler infrastructure and the Catalina scheduler, which also performs backfilling and supports reservations:

TABLE A

| Abbreviation | Site | CPUs | Jobs | Start | End | Util | Avg. Runtime [min] |
|---|---|---|---|---|---|---|---|
| CTC | Cornell Theory Center | 512 | 77,222 | June 1996 | May 1997 | 56% | 123 |
| KTH | Swedish Royal Instit. of Tech. | 100 | 28,490 | September 1996 | August 1997 | 69% | 188 |
| SDSC | San-Diego Supercomputer Center | 128 | 59,725 | April 1998 | April 2000 | 84% | 148 |
| BLUE | San-Diego Supercomputer Center | 1,152 | 243,314 | April 2000 | June 2003 | 76% | 73 |

Since the traces span the past decade, were generated at different sites, on machines with different sizes, and reflect different load conditions, it is believed that consistent results obtained are truly representative.

Scheduling schemes described herein include the following. Prior art schemes and hypothetical schemes are so indicated; other schemes are provided in accordance with alternative embodiments of the present invention. Definitions useful in understanding the scheduling schemes shown and described herein are interspersed hereinbelow.

The term "reservation" refers to a specific future time at which or during which the system intends to start running at least one given waiting job. The system may create reservations for a single job or for multiple jobs.

The term "backfilling" as used herein is defined as follows:
Given a facility which processes an incoming flow of incoming parallel programs, also termed herein "jobs", provided by a population of clients and which schedules the incoming flow by:
(a) generating a queue (termed herein a "wait queue") of incoming jobs which the facility decides not to run immediately upon submission, e.g. due to lack of resources;
(b) creating reservation/s for at least one of the parallel programs in the wait queue, typically but not necessarily in "first come first served" (FCFS) order, the reservation for a given parallel program in the queue defining a time frame at which or during which the system intends to start running that parallel program, e.g. based on available run time information which, conventionally, comprises user runtime estimates; and (c) In some applications, killing i.e. terminating incoming parallel programs only in accordance with a condition for killing parallel programs, conventionally based on comparing user run time estimates to actual run times.

"backfilling" means deciding that a selected "backfill job" from among the incoming parallel programs, e.g. in the wait queue, will start running now, before other parallel programs which have reservations, subject to the condition that running of the selected parallel program is not anticipated, based on available run time information which, conventionally comprises user run time estimates, to violate any existing reservations by using facility resources needed to carry out an existing reservation. Jobs that exceed their estimates are typically killed so as not to violate reservation(s).

The term "estimate" is used herein for a runtime approximation provided by a user upon job submittal. An estimate can be either explicitly specified by the client, or deduced from other job attributes: e.g. a job may be submitted to a queue with an associated upper bound on runtime (this upper bound can serve as an (implicit) estimate). In conventional backfilling, a job's estimate also serves as kill-time, such that if the actual runtime of a job exceed its runtime estimate, it is killed i.e. terminated.

The term "prediction" is used for an approximation used by the scheduler. In EASY as defined hereinbelow, predictions and estimates are equal, that is, the predictions are set to be the user estimates. According to a preferred embodiment of the present invention, historical data rather than or in conjunction with user estimates, is used to generate predictions.

The term "client" refers to a human user or to an agent representing a user from remote systems, as in a grid envelope. The term "user" is used herein as an example of and interchangeably with the term "client".

"Wait time" is the time period between the job's submission to its start time

"Average wait time" is the wait time averaged across all terminated jobs.

"Bounded slowdown" is max[1,(waittime+runtime)/max (runtime,10)] (times are specified in seconds).

"Average bounded slowdown" is the bounded slowdown averaged across all terminated jobs.

FCFS: Prior art. First come first served. Each submitted job specifies the number of processors it needs; jobs are queued by order of submission time; each job is started and runs to completion (no preemption) once enough processors are freed by previously submitted and already terminated jobs; jobs run in "batch mode" where the processors allocated to each job are exclusively used by it.

EASY or "vanilla EASY": Prior art. First come first served with backfilling. EASY uses FCFS and backfilling with one reservation. In EASY, all runtime predictions are based on user estimates. The EASY scheduler has a "main-loop" that reacts to at least three events: (a) job submission, (b) job termination, and (c) expired kill-timer-events, as follows:

if this is a job submission, insert the new job to the wait queue (ordered by FCFS). The job's runtime prediction is set to be the runtime estimate specified by the user.

if this is a kill-timer-event (as set in step 5 below), kill the associated job.

if this is a termination, disable the kill-timer-event of the associated job (unless it was already fired and this termination is its result).

Subsequently, let J denote the job at the head of the FCFS wait queue. Based on the predicted runtimes of currently running jobs, compute the earliest time when enough free processors will be available to meet the needs of J. This is called the shadow time. A reservation is made for J for this time.

Assume J needs N processors. Let S be its shadow time i.e. reservation. Based on runtime predictions, let M be the number of free processors that will be available at time S (this can be equal to or bigger than N). Denote the "extra" processors to be the M-N (M minus N) processors that will not be used by J at time S.

Iterate through the entire wait queue (which is in FCFS order), and for each job J2 do [denoting by N2 the number of processors needed by J2; denoting by T2 the predicted termination time of J2 if it starts running now; denoting by F the number of processors that are currently free; denoting by E the number of "extra" processors]:

if: (N2<=F) and (J=J2 or T2<=S or N2<=E) then:

i. remove J2 from the wait queue, start running J2, and ii. set a kill-timer-event to the predicted termination time of the job. The predicted termination time is based on the runtime prediction, which is the user estimate in EASY's case. The kill-timer-event is processed at the designated time (step 2 above) or disabled if the job terminates before its predicted termination (step 3 above), and iii. return to step 4. This is repeated until all the jobs in the wait queue have been traversed.

The above sequence of steps is denoted EASY's "main loop" herein and can be implemented in various ways. As EASY's runtime predictions are defined as user estimates, a job is killed when its user estimate is reached, but never before. This is a property preserved by all backfill schedulers, whereby an estimate serves as part of the user "contract" in the sense it assures the user that his job will not be killed until its estimate is reached. Consequently, the difficulty in replacing user estimates with system-generated prediction, is to avoid pre-mature killings of jobs (in case system predictions turn out too short), as users will not tolerate their jobs being prematurely killed just because of erroneous system speculations.

In EASY, backfilling is the act of starting to run a job J2 that is different than the job J which is located at the head of the FCFS wait queue. With respect to the "if" condition in the above step 5, a backfill job is J2 such that:

J<>J2 and (T2<=S or N2<=E)

EASY allocates only one reservation at a time (for the first queued job), but other backfill schedulers can allocate more. Additionally, EASY uses FCFS to determine the order of waiting jobs, but other backfill schedulers can use other orders.

EASYpcor: First come first served with backfilling and with prediction correction. Prediction-correction is a mechanism that dynamically increases too-short runtime prediction while jobs are running and allows system-generated prediction to be incorporated within backfill schedulers. The "main-loop" of the scheduler is modified, relative to EASY, to handle a new type of a timer-event called an "update-timer-event", as follows:

When the scheduler starts running a job, e.g. step 5(i) of EASY, an update-timer-event is set to the job's predicted termination time T. The prediction can be based on user estimates or can be generated by the system; T is computed according to a predetermined runtime prediction which may be user-selected or system-generated.

If the job terminates before T, then the update-timer-event is disabled. Otherwise, the update-timer-event fires and triggers the following activity:

A increased runtime prediction (larger than the current runtime of the under-predicted job) is generated and assigned to the under-predicted job.

A new update-timer-event is set for the new predicted-termination of the job.

The scheduler view of what is going to happen in the future (e.g. the shadow-time and extra-processors of EASY as described above) is recomputed in accordance to the new runtime prediction of the under-predicted job (e.g. the appropriate steps in the scheduler's main-loop are executed; in EASY these are steps 4-5).

After the initial set-up of step-1 above, whenever an update-timer-event fires, go to step 3 (the previous step).

In EASYpcor, prediction correction is employed as defined above. In practice, this method makes it possible to use system-generated predictions instead of user estimates. In EASYpcor, another type of timer-event is added and the steps of EASY are typically modified as follows:

This step typically remains unchanged.

If this is a kill-timer-event (as set in step 5 below), kill the associated job. However, if this is an update-timer-event, as set in step 5 below, generate a new update-timer-event and update the scheduler's view of the future, in accordance to steps 3-4 of "prediction correction" as defined above.

If this is a termination, disable the kill-timer-event of the associated job (unless it was already fired and this termination is its result). Additionally, disable the update-timer-event, in accordance to step 2 of "prediction correction".

4. This step typically remains unchanged.

5. In addition to the killer-time event, set an update-timer-event to fire at the predicted termination time.

Most often, the update-timer-event is redundant: it both fires and is disabled along with the kill-timer-event. However, in some cases jobs outlive their user estimates (e.g. because it takes time to kill the job or because the job was permitted to run beyond its estimate by the administrator). In this case, at least one (and possibly more) update-timer-event will be fired and handled before the kill-timer-event.

EASY+: EASYpcor with system-generated predictions. The following steps of EASYpcor are modified, in EASY+, as follows:

If this is a job submission, insert the new job to the wait queue. In addition, perform the following steps (denoting J as the new job and U as the user that submitted J):

Generate a runtime prediction for J as the average runtime of the two most recently submitted jobs by U that have already terminated. Data is maintained as described above in step III. If no such history jobs exist, the generated prediction is the original user estimate.

Set the said generated runtime prediction to be the prediction to be used by later steps of this method.

If this is a kill-timer-event (as set in step 5 below), kill the associated job. However, if this is an update-timer-event, generate a new update-timer-event and update the scheduler's view of the future, in accordance to steps 3-4 of "prediction correction". The updated prediction is generated as follows:

If the previous (too short) runtime prediction is smaller than the user runtime estimate, then the new prediction is set to be the user runtime estimate.

Otherwise, if the previous (too short) runtime prediction is equal to the user estimate, then the new prediction is set to be the user estimate plus one minute.

Otherwise, if the previous (too short) runtime prediction is equal to the user estimate plus one minute, then the new prediction is set to be: E+15*2k−2[minutes], where E is the original user runtime estimate in minutes, and k is the number of times the runtime prediction was updated for this job, since the previous step 2(iii) was performed (step 2(ii) is "counted" within k).

If this is a termination, disable the kill-timer-event of the associated job (unless it was already fired and this termination is its result). Additionally, disable the update-timer-event, in accordance to step 2 of "prediction correction". Finally (denoting J as the terminated job; U as the user that submitted J; J1 as the most recently submitted and already terminated job by U, if exists; J2 as the most recently submitted and already terminated job by U that was submitted before J1, if exists), log the submit time and runtime of J if its submit time is bigger than the submit time of J1 or J2. If this is the case, and if both J1 and J2 exist, the logging is done within the memory that previously occupied the submit- and run-time of J2.

The above method can be applied to any backfill scheduler, changing the number of reservations, order of the wait queue and other scheduler-specific parameters as appropriate. Additionally, any other prediction and prediction-correction techniques can be used instead of what is suggested above (e.g. base predictions on the average runtime of all the jobs by the same user, or all the similar jobs by the same user where similarity can be defined for example by the number of processors used by the job.

Immediate-EASY+: A variant of EASY+ whereby a system-generated prediction in step-1 of EASY+'s main loop (average runtime of last two jobs by the same user) is made only if J1 and J2 (as defined in step 3 of EASY+) exist, and have a user estimate equal to that of the newly submitted job. Otherwise, the original user estimate is used as a prediction.

All-EASY+: A variant of EASY+ where by a system-generated prediction in step 1 of EASY+'s main loop (average runtime of last two jobs by the same user) is made regardless of J1's and J2's user runtime estimate. J1 and J2 are defined in step-3 of EASY+. In other words, if the two history jobs exist, the system generates a prediction; otherwise, the original user estimate is employed.

SJBF: Shortest job backfilled first, that is, the backfilling order is set to be in ascending order of runtime predictions, whereas the reservation order is set to be FCFS. "Backfill order" is the order according to which the wait queue is traversed to find and start jobs in the current time, without violating subsequent reservations. (In EASY/EASYpcor/EASY+, the backfill order is FCFS (first come first served). "Reservation order" is the order according to which reservations are allocated. In EASY/EASYpcor/EASY+ the reservation order is FCFS, and at any time instance there exists at most one reservation. A particular feature of SJBF, according to a preferred embodiment of the present invention, is separation of backfill order from reservation order. In other words, the order in which reservations are allocated is set to be different than the backfill order. In the prior art, the two orders are always one and the same, that is, the wait queue is ordered according to a single criterion (e.g. by submission time, or by the ratio of wait-time plus estimated runtime to estimated runtime, etc.) and both reservations and backfilling activity were determined according to this order. In contrast, according to a preferred embodiment of the present invention, backfill order and reservation order differ.

EASYsjbf: EASY with SJBF.

EASY++: EASY+ with SJBF.

Immediate EASY++: immediate-EASY+ with SJBF.

All-EASY++: all-EASY+ with SJBF.

Unless stated otherwise, "EASY+" or "EASY++" herein refer to "all-EASY+" and "all-EASY++", respectively.

PERFECT++: Hypothetical. EASY++ using actual runtimes as predictions instead of user estimates or system-generated predictions. No prediction correction is needed as all estimates and predictions are completely accurate.

X2 or "vanilla X2": EASY, modified such that all user estimates are doubled before they are used.

X2+: EASY+, modified such that all user estimates and system-generated runtime predictions are doubled before they are used.

X2: EASY++, where by all user estimates and system-generated runtime predictions are doubled before they are used.

X2perf: Hypothetical. X2, using real runtimes instead of estimates and predictions. No prediction correction is needed as all estimates and predictions are completely accurate.

X2++perf: Hypothetical. X2++, using real runtimes instead of estimates and predictions.

Note that in this case no prediction correction is needed as all estimates and predictions are completely accurate.

SJF: EASY, in which the wait queue order is changed from FCFS to Shortest-Job First, that is, the wait queue is sorted in increasing order of user runtime estimates, and this order is used both for backfill order and for reservation order.

SJF+: EASY+, in which the wait queue order is changed from FCFS to Shortest-Job First, that is, the wait queue is sorted in increasing order of runtime prediction, and this order is used both for backfill order and for reservation order. SJF+ and SJF++ are equivalent because both employ SJBF by definition.

SJFperf: Hypothetical. SJF using actual runtimes instead of user- or system-generated predictions.

Estimate-Backfilling: Any backfilling method that employs prediction correction as defined above and makes use of user runtime estimates when performing backfilling.

Estimate-less-Backfilling: Any backfilling method that employs prediction correction as defined above and does not use user estimates pertaining to the job under consideration at all. "Estimate-less backfilling" significantly simplifies the user interface, and frees users from any obligation to supply user runtime estimates. Jobs are not killed once their estimate is reached (as there is no user estimate) and instead are free to continue running. As a result, all the work done by a job that in vanilla backfilling would have been killed, is not wasted in estimate-less backfilling.

For example, EASY+ as defined above uses user estimates on 2 occasions: in step 1(i), where there is still no history that is associated with the user, and in step 2(i), where the initial system-generated prediction has proved to be too short, and thus the prediction-correction mechanism sets the new prediction to be the original user estimate.

Estimate-less backfilling can use any arbitrary value for step 1(i). This can be the average runtime of all or some of the other terminated jobs, it can be the administrative runtime upper bound of the system or queue to which the job was submitted, or it can be simply a constant like one minute, and so on. In case the chosen value proves too short (regardless of how it was chosen), the prediction correction mechanism becomes operative and dynamically updates the chosen value along with any data structures dependent thereupon.

Estimate-less backfilling can use any suitable scheme to increase too-short predictions without resorting to user estimates (replacing step 2(i) of EASY+). For example, the scheme may rely on other (terminated) history jobs with runtimes that are bigger than the too-short prediction. Alternatively, the scheme may double the too-short prediction (or any multiple with a factor that is bigger than 1), or may gradually increase as is used in step 2(iii) of EASY+, and so on. In case the chosen value proves too short (regardless of how it was chosen), the prediction correction mechanism becomes operative and dynamically updates the chosen value along with any data structures dependent therefrom.

Estimate-less backfilling obviates the need for clients to provide runtime estimates. The prompt to provide these estimates may be removed from the interface through which jobs are submitted, or may be indicated to be optional.

Information-less-Backfilling: Any estimate-less-backfilling method that employs prediction correction as defined above and does not use history jobs.

An example of such a method is generating a constant prediction for all incoming jobs (e.g. one minute, the maximal allowed runtime for the system). If the prediction proves to be too short, the mechanism of prediction correction becomes operative and updates the prediction and the appropriate scheduler's data structure to reflect the new conditions.

"Information-less" prediction uses neither user estimates nor history nor any information regarding the job at all, including its number of processors, and the ID of the user or executable. For example, an information-less predictor cannot predict a different runtime for serial and highly parallel jobs.

History-Backfilling: Estimate-backfilling or Estimate-less-backfilling, that makes use of history jobs (at least in part, for at least some of the jobs) in order to generate runtime predictions. It is appreciated that any such methods fall within the scope of the present invention.

For example, EASY+ makes use of two history jobs to generate a prediction (the average runtime of the two most recently submitted and already terminated jobs by the same user). Suitable prediction techniques may be based on generic algorithms as described in the above-referenced articles by Smith, learning algorithms or rough set theory. The function used to generate the prediction may also vary: e.g. in EASY+ the average may be used, but median or minimal or maximal (etc.) values could have also been used; or linear regression could be applied on the runtime of the history jobs.

Job Similarity Two (or more) jobs can be characterized as "similar", if one or more of their attributes are similar. For example, two jobs submitted by the same user may be judged similar. The similarity criterion may be more elaborated: e.g. two jobs with the same user, and same number of required processors (this is denoted as the "size" of the job), and the same runtime estimate, are judged similar. Various transformations on the job's attributes can be applied when determining if jobs are similar, e.g. if the difference between the size of the two jobs is smaller than, say, 10, they are judged similar. In general, any method that (at least partly) uses the jobs' attributes to determine similarity falls under this definition.

Job Recency: A job is considered more recent than another job if the submit time of the former is later than the submit time of the latter. The greater the submit time, the more recent the job is deemed to be.

Recent-History-Backfilling: Any history-backfilling method, which when making a runtime prediction prefers recent jobs over similar jobs (as defined above), or uses recency (at least partly) as a selection criterion of jobs upon which the runtime prediction would be based. For example, EASY+ main criteria for job selection include recency (the two most recently submitted already terminated jobs) and similarity (by the same user).

Similar-History-Backfilling: Refers to any history-backfilling method that when making a runtime prediction uses job similarity (at least partly) as a selection criterion of jobs upon which the runtime prediction would be based. It is appreciated that any such methods fall within the scope of the present invention.

Hybrid-History-Backfilling: Any history-backfilling method which, when making a runtime prediction, uses similarity and/or recency and/or the information-less scheme, at least partly, as criteria for choosing a job according to which the prediction will be generated.

For example, EASY+ is a hybrid history prediction method as it employs two criteria for job selection: recency (the two most recently submitted already terminated jobs) and similarity (same user).

Session: A period of logically continuous work or activity period with the computer, performed by some unique client, typically comprising an individual human user. The user is not necessarily active 100% of the session's time—a user may run a job to completion, think about the result, and run another job, all within the same session. For example, the time between the completion of the previous job and the submission of the current job is called the "think time" of the current job. Jobs may be considered to be within a single session if there is a short think time (for example, smaller than 20 minutes). Suitable definitions of "session" are discussed in the following references, the disclosures of which are hereby incorporated by reference:

[1] M. Arlitt, Characterizing Web User Sessions. In Perf. Eval. Rev. 28(2), pp. 50-56, September 2000.
[2] Julia Zilber, Ofer Amit and David Talby, "What is Worth Learning from Parallel Workloads? A User and Session Based Analysis". In International Conference on Supercomputing 2005 (ICS '05), June 2005.

Session-Backfilling: Any history-backfilling (including all the history backfilling schemes defined above, and to some extent, the information-less scheme), which, when making a runtime prediction, uses job sessions (at least partly) as a selection criterion of jobs upon which the runtime prediction would be based.

Two-Order-Backfilling: Any backfilling method that separates backfill order from reservation order (as defined above).

Favor-Short-Backfilling: Any backfilling method that uses a backfill order (as defined above) that explicitly or implicitly favors jobs with short (relative to other jobs) predicted runtime. For example, the method may comprise SJBF, or alternatively, may comprise generating a queue in descending order of (wait_time+prediction)/prediction, such that a small denominator implies high priority.

Favor-Short-Pcor-Backfilling: Any favor-short-backfilling method that employs prediction correction as defined above, such as but not limited to EASY++ described herein.

It is appreciated that any combination of the schemes defined above falls within the scope of the present invention. It is appreciated that the above definitions comprise preferred or common embodiments of the respective terms and that specific features included in the above definitions may be modified or omitted in certain applications.

User runtime estimates may be specified explicitly by clients such as but not limited to human users, or may be implied from other attributes of the submitted parallel program, such as association of the parallel program with a queue that imposes an upper bound on the runtimes of the jobs that populate it. Reservations may for example comprise a stipulation of a start time or stipulation of a time interval during which the start time will occur.

The most popular conventional scheduling policy for parallel systems is FCFS with backfilling, as introduced by the EASY scheduler. With backfilling, users supply an estimate of how long their jobs will run, to enable the scheduler to make reservations and ensure that they are respected. But user estimates are highly inaccurate and significantly reduce system performance. The alternative is system-generated predictions based on users' history, which are considerably more accurate. Nevertheless, predictions were never incorporated into production systems.

In conventional backfilling, user estimates are part of the user contract: jobs that exceed their estimates are killed by the system, so as not to violate subsequent commitments. This makes system-generated predictions unsuitable, as some predictions inevitably turn out too short, and users will not tolerate their jobs being killed prematurely just because of erroneous system speculations. According to a preferred embodiment of the present invention, the system is operative to: (1) use user estimates exclusively as kill-times, (2) base all or most other scheduling decisions on system-generated predictions, and (3) dynamically increase predictions outlived by their jobs, and push back affected reservations, in order to provide the scheduler with a truthful view of the state of the machine as is defined above in prediction-correction. Applying this to EASY, namely, using all-EASY+ as defined above, usually results in a ~25% reduction in average wait time and bounded slowdown.

A number of studies propose deliberately making user estimates even less accurate by doubling or randomizing them. Doubling helps because it induces "heel and toe" backfilling dynamics that approximates an SJF-like schedule, by repeatedly preventing the first queued job from being started. Thus doubling trades off fairness for performance and should be viewed as a property of the scheduler, not the predictor, because the more accurate predictions are, the better the results that doubling obtains. Therefore, the aforementioned tradeoff can be avoided by explicitly using a shortest job backfilled first (SJBF) backfilling order. By preserving FCFS for reservation order, a fair scheduler that nevertheless backfills effectively is achieved. Applying this to EASY$^+$ can nearly double the performance (up to 47% reduction in average "bounded" slowdown). This enhanced method is termed herein "EASY$^{++}$".

Conventional prediction methods all suffer from at least one (and sometimes all) of the following drawbacks: (1) they require significant memory and complex data structures to save the history of users, (2) they employ a complicated prediction method (to the point of being off-line), and (3) they pay the price in terms of computational overheads for maintaining the history and searching it. According to a preferred embodiment of the present invention, conventional prediction methods are replaced by employing a very simple predictor that is both easy to implement and suffers almost no overheads: the average runtime of the two most recently submitted (and already terminated) jobs by the same user. This predictor's success stems from the fact it focuses on recent jobs, in contrast to previous predictors that focused on similar ones (in terms of various job attributes). Performance degradation has been found to be more or less linearly proportional to the number of past jobs upon which the prediction is based, suggesting that a prediction window of only one or two jobs is optimal.

It is appreciated that the optimization techniques shown and described herein may be applied to any suitable backfilling scheduler.

There is thus provided, in accordance with a preferred embodiment of the present invention, a system and method for performing backfilling on an incoming flow of incoming parallel programs provided by a population of clients to a facility, the system comprising a computer-controlled prediction functionality operative to generate a current run-time prediction for at least some of the incoming parallel programs, a backfiller performing backfilling on the incoming flow of incoming parallel programs based at least partly on at least some of the run-time predictions; and a prediction updater operative, if the current run-time of an incoming parallel program currently in process exceeds the current run-time prediction, to generate an updated run-time prediction to exceed the current run-time, and to re-define the current run time prediction to be greater than the current run-time, thereby to allow the backfiller to continue performing backfilling based on the updated run-time prediction.

Also provided, in accordance with another preferred embodiment of the present invention, is a method for performing backfilling on an incoming flow of incoming parallel programs provided by a population of clients to a facility, the method comprising using a computer-controlled process to generate a current run-time prediction for at least some of the incoming parallel programs; and performing backfilling on the incoming flow of incoming parallel programs based at least partly on at least some of the run-time predictions, including prioritizing shorter parallel programs from among the incoming parallel programs.

Further provided, in accordance with another preferred embodiment of the present invention, is a system for performing backfilling on an incoming flow of incoming parallel programs provided by a population of clients to a facility, the system comprising a computer-controlled process operative to generate a current run-time prediction for at least some of said incoming parallel programs; and a backfiller performing backfilling on the incoming flow of incoming parallel programs based at least partly on at least some of said run-time predictions, the backfiller being operative to prioritize shorter parallel programs from among said incoming parallel programs.

Also provided, in accordance with another preferred embodiment of the present invention, is a computer-controlled method or process for scheduling jobs, also termed herein parallel programs, submitted by a population of users for execution by a facility such as a supercomputer, wherein a contract which may exist between the population of users and the facility defines a condition for killing parallel programs, the method comprising using a computer-controlled process to generate a run-time estimate for each incoming parallel program within a flow of incoming parallel programs, including generating run-time predictions for at least a subset of said incoming parallel programs which are not constant and which do not rely exclusively on user-generated run-time estimates for said subset of incoming parallel programs; scheduling the incoming flow of jobs for execution by the facility, based on said run-time predictions, including: arranging said incoming flow of jobs in an a priori order defining an a priori cardinal position for each incoming parallel program e.g. proceeding on a FCFS basis; allowing each individual incoming parallel program to run ahead of its cardinal position provided it meets a run-ahead criterion, the run-ahead criterion of an individual incoming job including a criterion that the individual incoming job, based on its run time estimate, does not delay at least a first-queued incoming job; and optionally, killing individual incoming parallel programs only as defined by said contract.

Further in accordance with a preferred embodiment of the present invention, use of a computer-controlled process to generate a run-time prediction comprises generating a session-based prediction of the run-time for at least one incoming job within the incoming flow of jobs.

Still further in accordance with a preferred embodiment of the present invention, use of a computer-controlled process to generate a run-time prediction comprises generating a session-based prediction of the run-time for at least one incoming job within the incoming flow of jobs.

Additionally in accordance with a preferred embodiment of the present invention, the session-based prediction generation comprises selecting a comparable job subset from a set of terminated jobs performed in the past by a user associated with the individual incoming job, based on a job-comparison suitability criterion; and setting the session-based prediction based on a central tendency of the job times of the jobs belonging to said comparable job subset.

Further in accordance with a preferred embodiment of the present invention, the job-comparison suitability criterion comprises a combination of at least one of the following job-comparison suitability characteristics: recency of a terminated job belonging to said set of terminated jobs; and similarity of the terminated job to the individual incoming job. Still further in accordance with a preferred embodiment of the present invention, similarity comprises similarity in at least one of the following similarity characteristics: similarity in the unique user/client submitting the job, similarity in the number of processors used by the terminated job and the incoming job; similarity in the user estimated run time provided by the user for the terminated job and for the incoming job; and similarity between the terminated job's executable code and the incoming job's executable code. Similarity may also comprise similarity with respect to requested memory, queue, user's group, and requested CPU time.

Still further in accordance with a preferred embodiment of the present invention, the use of a computer-controlled process to generate a run-time estimate comprises generating an estimate-less prediction of the run-time for at least one incoming job within the incoming flow of jobs.

Further in accordance with a preferred embodiment of the present invention, use of a computer-controlled process to generate a run-time estimate comprises generating an information-less prediction of the run-time for at least one incoming job within the incoming flow of jobs.

Still further in accordance with a preferred embodiment of the present invention, use of a computer-controlled process to generate a run-time estimate comprises generating a recent user history-based prediction of the run-time for at least one incoming job within the incoming flow of jobs.

Additionally in accordance with a preferred embodiment of the present invention, recent user history-based run-time prediction of at least one incoming job's runtime comprises a central tendency of the runtimes of a predetermined number of the most recent terminated jobs belonging to the user associated with said incoming job.

BRIEF DESCRIPTION OF THE DRAWINGS

Preferred embodiments of the present invention are illustrated in the following drawings:

FIGS. 5A-5G are graphs describing quality of performance of a scheduling method operative in accordance with a preferred embodiment of the present invention as a function of the levels of various relevant parameters;

FIG. 6A-6F are graphs describing quality of performance of a scheduling method operative in accordance with a preferred embodiment of the present invention as a function of the levels of various relevant parameters;

DETAILED DESCRIPTION OF PREFERRED EMBODIMENTS

Conventional batch job schedulers for parallel supercomputers select jobs for execution in first-come-first-serve (FCFS) order, and run each job to completion. The problem is that this simplistic approach causes significant fragmentation, as jobs do not pack perfectly and processors are left idle. Most schedulers therefore use backfilling: if the next queued job cannot run because sufficient processors are not available, the scheduler nevertheless continues to scan the queue, and selects smaller jobs that may utilize the available resources.

Figure 3:
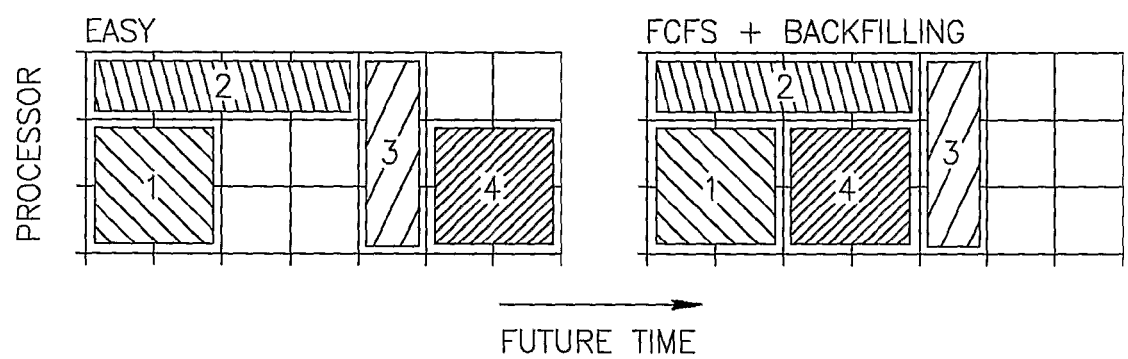
FIG. 3 is a prior art diagram comparing EASY scheduling with FCFS-backfilling scheduling, the numbering of the jobs (I, II, . . . ) corresponding to their submission order.

A potential problem with backfilling is that the first queued job may be starved as subsequent jobs continually jump over it. This is solved by making a reservation for this job, and allowing subsequent jobs to run only if they respect it. An example of this is shown in FIG. 3. In the example of FIG. 3, EASY backfilling reduces fragmentation. It would have been impossible to backfill job IV had its length been more than 2, as the reservation for job III would have been violated. EASY was the first backfilling scheduler. Many backfilling variants have been suggested since, e.g. using more reservations, employing a non-FCFS wait queue order, etc. However, the default of most parallel schedulers has remained plain EASY.

The most commonly used scheduling method for parallel supercomputers is FCFS with backfilling, as originally introduced in the EASY scheduler. Backfilling means that short jobs are allowed to run ahead of their time provided they do not delay previously queued jobs (or at least the first queued job). To make such determinations possible, users are required to provide estimates of how long jobs will run, and jobs that violate these estimates are killed. Empirical studies have repeatedly shown that user estimates are inaccurate, and that system-generated predictions based on history may be significantly better. However, predictions have not been incorporated into production schedulers, partially due to a misconception claiming inaccuracy actually improves performance, and partly because underprediction is unacceptable: users will not tolerate jobs being killed just because system predictions were too short.

Figure 1A:
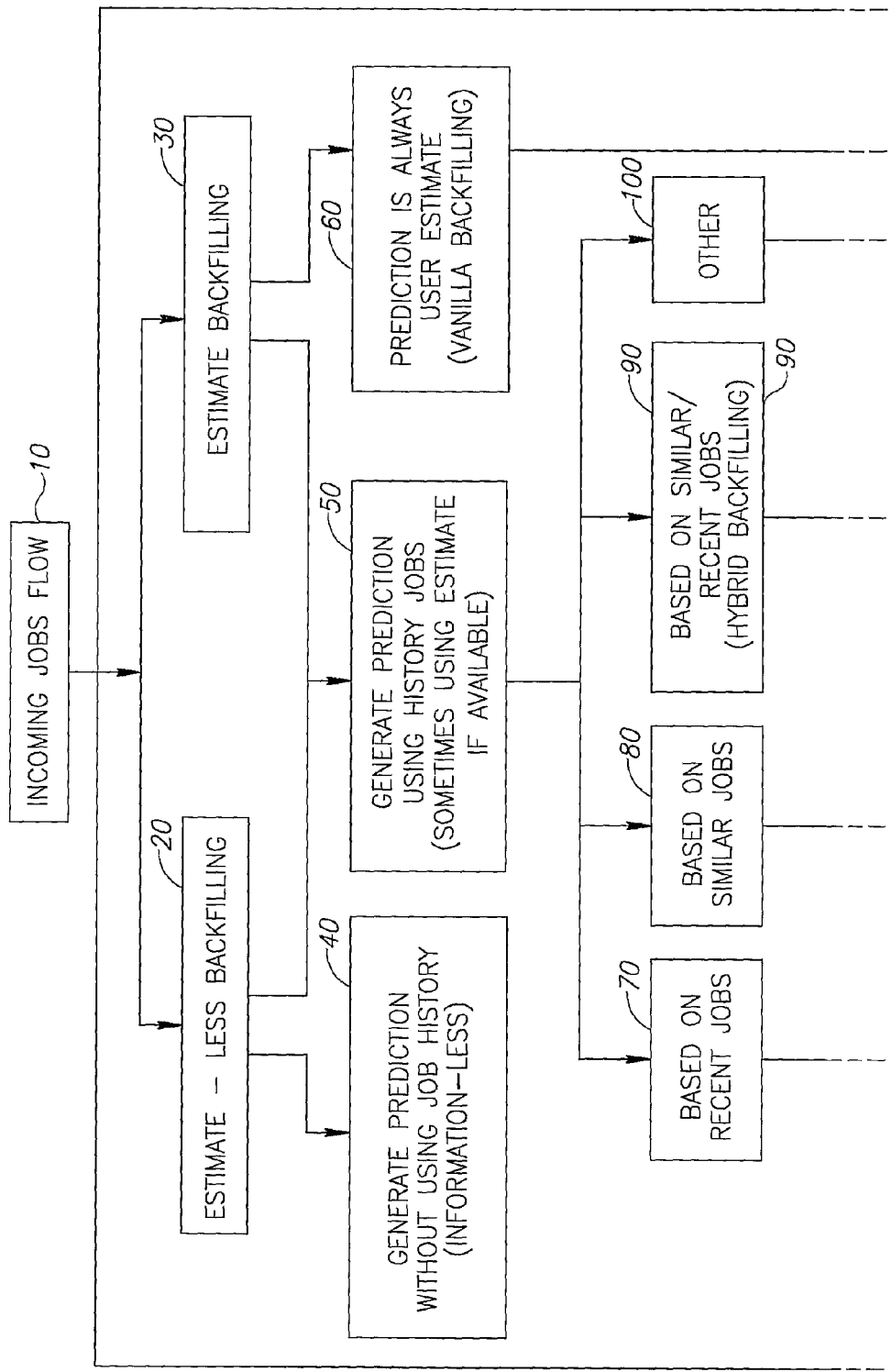
FIGS. 1A-1B, taken together, form a diagram illustrating various alternative embodiments of a system for backfilling using system-generated predictions rather than user run-time estimates, constructed and operative in accordance with preferred embodiments of the present invention.
Figure 1B:
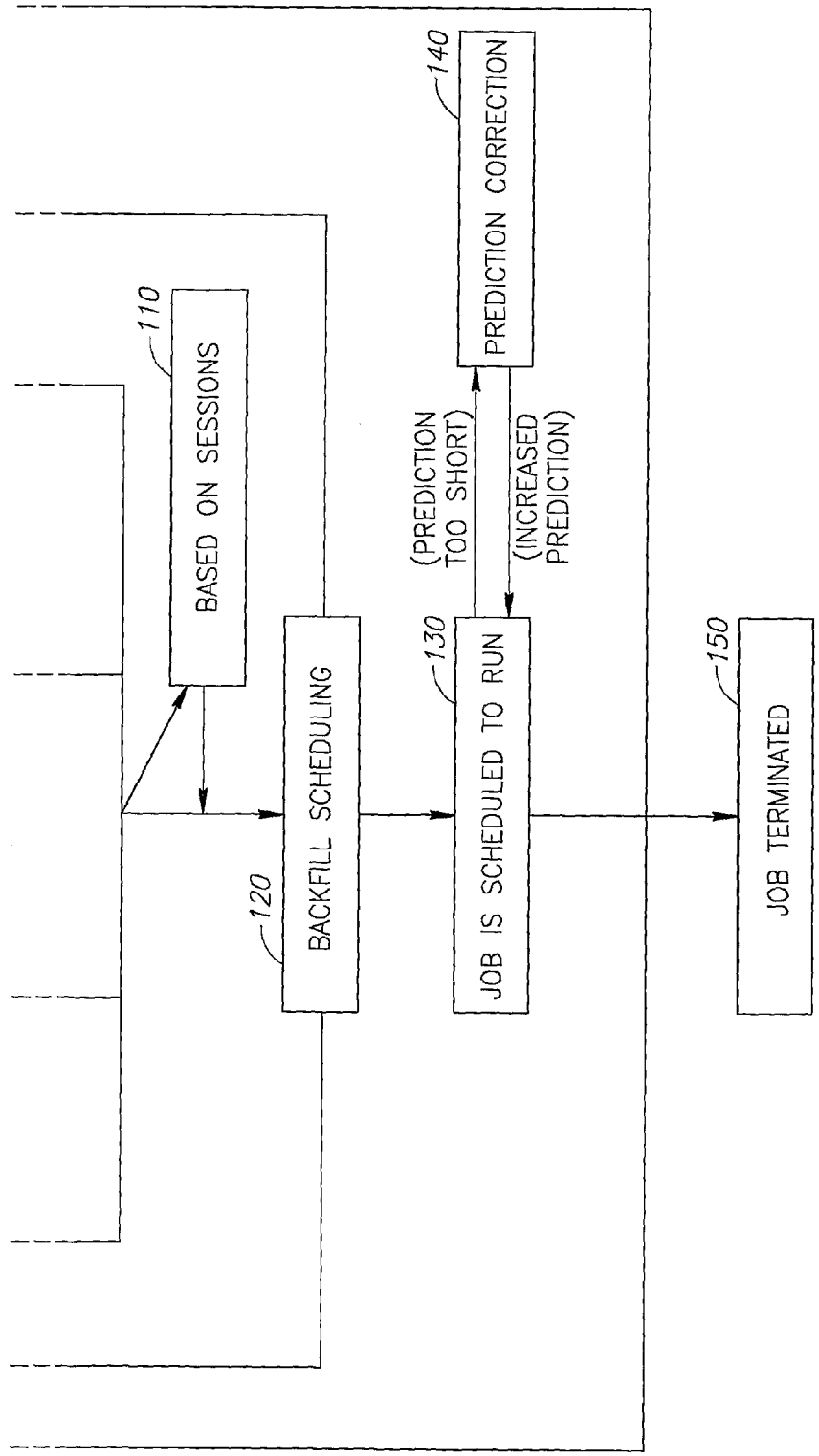

Reference is now made to FIGS. 1A-1B which, taken together, form a diagram illustrating various alternative embodiments of the present invention which can be provided in isolation or, except where contradictory, in combination. The diagram of FIGS. 1A-1B illustrates a system for performing backfilling on an incoming flow 10 of incoming parallel programs provided by a population of clients to a facility, the system typically comprising a computer-controlled prediction functionality (40, 50 or 60) operative to generate a current run-time prediction for at least some of the incoming parallel programs; a backfiller 120 performing backfilling on the incoming flow of incoming parallel programs based at least partly on at least some of the run-time predictions; and, optionally, a prediction updater 140 operative, if the current run-time of an incoming parallel program currently in process exceeds the current run-time prediction, to generate an updated run-time prediction to exceed the current run-time and, to re-define the current run time to equal the updated run-time prediction, thereby to allow the backfiller 120 to continue performing backfilling based on the updated run-time prediction.

The backfiller 120 is preferably operative to prioritize shorter parallel programs from among the incoming parallel programs.

Optionally, the backfiller 120 performs backfilling based at least partly on user estimates (block 60). Alternatively, the backfiller does not resort to user estimates and may even perform backfilling which is entirely information-less (block 40).

The backfiller typically performs history-based backfilling (block 50), optionally giving precedence to recent history (block 70), similar history (block 80), or both. The backfiller may or may not utilize information characterizing at least one user session (block 110).

The system of FIGS. 1A-1B and that of FIG. 2A described below, typically includes a reservation generator operative to generate a temporal sequence of reservations defined in accordance with a first ordering scheme for a first plurality of waiting incoming parallel programs in the incoming flow whereas the backfiller, which is operative to advance a second plurality of waiting incoming parallel programs in the incoming flow without disturbing any reservation in the temporal sequence of reservations, performs its advancing in accordance with a second ordering scheme of the second plurality of programs. According to one embodiment of the present invention, the second ordering scheme differs from the first ordering scheme.

Figure 2A:
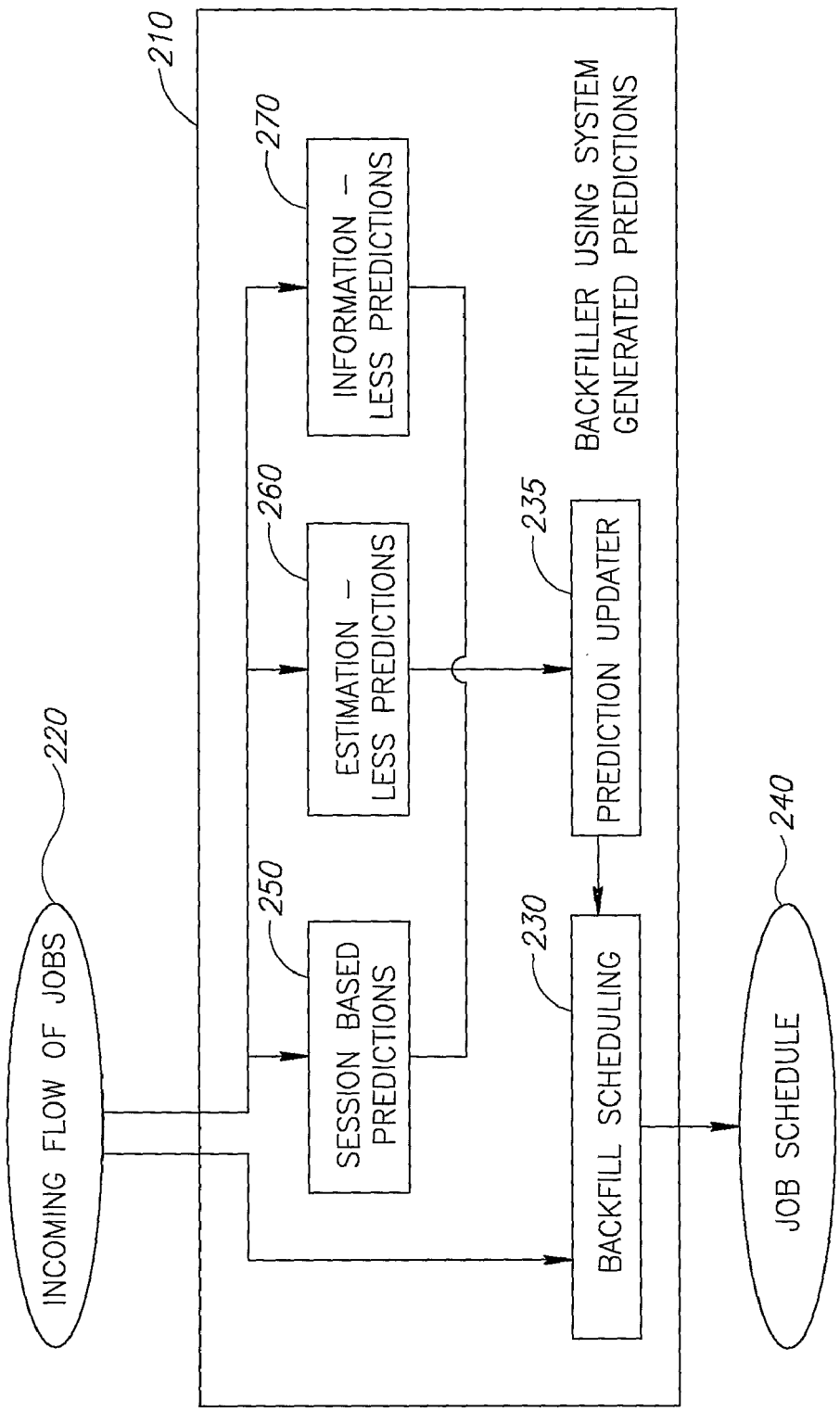
FIG. 2A is a simplified functional block diagram of an example of a system for backfilling using updated system-generated predictions which is constructed and operative in accordance with a preferred embodiment of the present invention.

FIG. 2A illustrates an example of a backfilling system employing some but not all of the features set forth in FIGS. 1A-1B. The apparatus of FIG. 2A includes a backfiller 210 using updated system-generated predictions, rather than user estimates, to perform the backfilling function as described in detail herein. The system of FIGS. 1A-1B includes one or several selectable or combinable prediction functionalities described in detail below, which serve a backfill scheduling functionality 230 preferably receiving prediction updates from a prediction updater 235. Backfill scheduling functionality 230 is generally similar to conventional backfilling functionalities except that it relies on system-generated predictions rather than relying on user estimates and it also is operative to receive updates of these predictions from prediction updater 235, as described in detail below with reference to FIG. 2. The three prediction functionalities shown and described herein merely by way of example, include a session based prediction functionality 250, an estimation-less prediction functionality 260 and an information-less prediction functionality 270 which are used selectably or in combination by the backfilling functionality however it is appreciated that any other suitable prediction functionality may be employed alternatively, in addition, or in combination as described above with reference to FIGS. 1A-1B. The functionalities of FIGS. 1-2A are each described in detail herein.

Figure 2B:
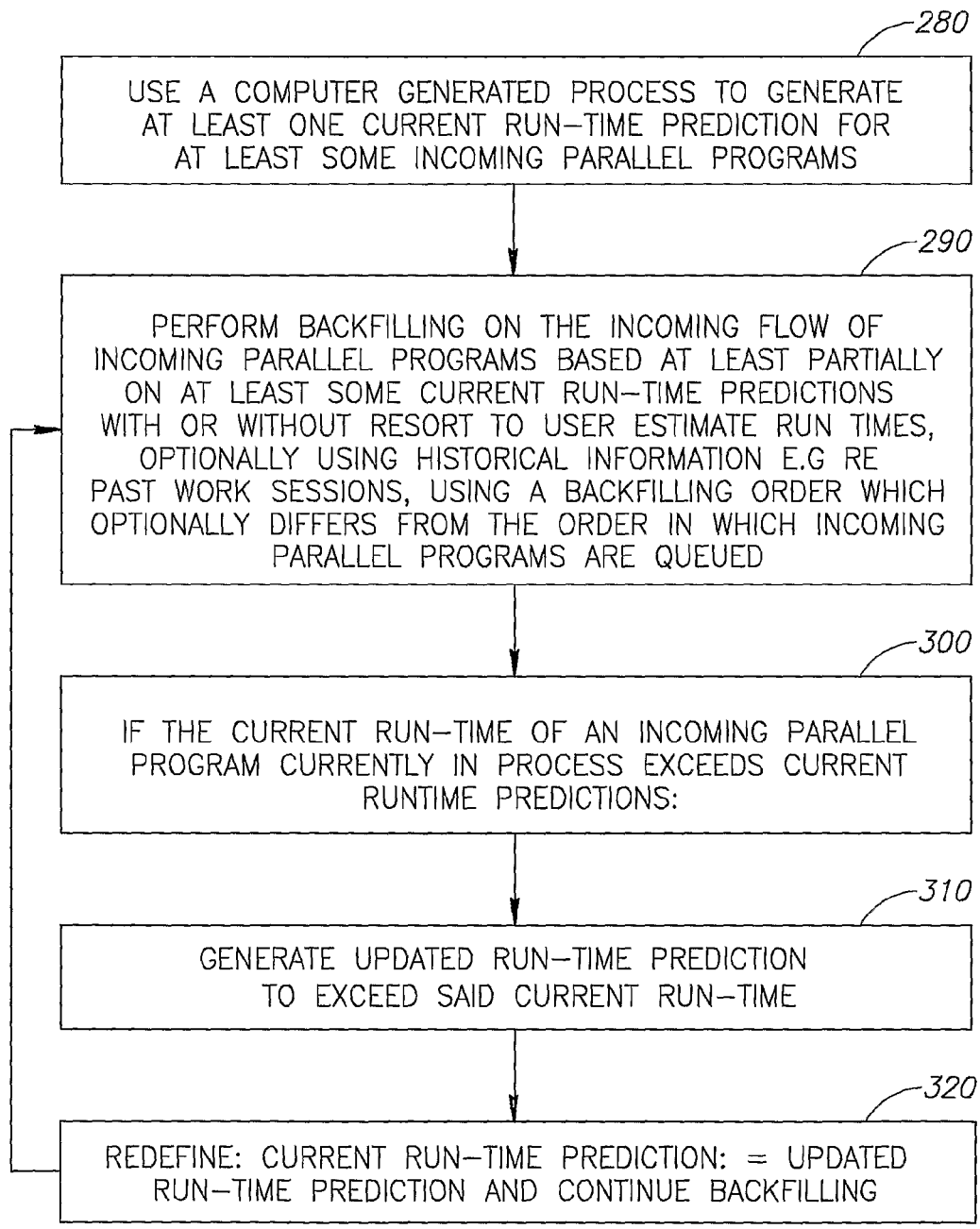
FIG. 2B is a simplified flowchart illustration of a method of operation for the system of FIGS. 1A-1B or 2, constructed and operative in accordance with a preferred embodiment of the present invention.

FIG. 2B is a simplified flowchart illustration of a preferred method of operation for the system of FIG. 1 or 2A-2B. As shown, a current run-time prediction is generated, e.g. by one or more of prediction functionalities 250, 260 and 270 or by any prediction functionality shown and described herein, for at least some incoming parallel programs. Backfilling is then performed on the incoming flow of incoming parallel programs typically based on run-time predictions which may or may not be combined with user estimated run times. If the current run-time of any incoming parallel program currently in process exceeds its run-time prediction, an updated run-time prediction is generated to exceed the current run-time. Backfilling proceeds using the updated run-time prediction. For example, for all-EASY+, the average number of runtime predictions is ~1.1.

In the scheduling system shown and described herein, kill-time is divorced from the runtime prediction, and predictions are corrected adaptively if they are proved wrong. The scheduler shown and describes herein typically uses FCFS as a basis and behaves exactly like EASY as far as users are concerned; nevertheless, it achieves significant improvements in performance, predictability, and accuracy. The backfilling performed by unit 230 preferably but not necessarily performs backfilling in shortest-jobs-backfilled-first order. A preferred embodiment of the system shown and described herein is based on a predictor 235 that averages the runtimes of the last two jobs by the same user. More generally, according to a preferred embodiment of the present invention, using recent data takes precedence over mining non-recent history for similar jobs. All the techniques and systems shown and described herein can be used to enhance any backfilling method, and are not limited to EASY.

User Runtime Estimates. Backfilling assumes the runtime of jobs to be known: both when computing the reservation (requires knowing when processors of currently running jobs will become available) and when determining if waiting jobs are eligible for backfilling (must terminate before the reservation). Therefore, EASY required users to provide a runtime estimate for all submitted jobs, and the practice continues to this day. Jobs that exceed their estimates are killed, so as not to violate subsequent commitments. The assumption is that users would be motivated to provide accurate estimates, because (1) jobs would have a better chance to backfill if their estimates are tight, but (2) would be killed if they are too short. Nevertheless, empirical studies of traces from sites that actually use EASY show that user estimates are generally inaccurate. The search for better estimates has focused on using historical data.

Scheduler performance may be measured using average wait time and bounded slowdown. The wait period is between a job's submittal and its start time. Slowdown is response time (wait-plus run-time) normalized by running time. Bounded slowdown eliminates the emphasis on very short jobs due to having the running time in the denominator; a commonly used threshold of 10 seconds was set yielding the formula $$\max\left(1, \frac{T_w + T_r}{\max(10, T_r)}\right)$$

The measure of accuracy is the ratio of the real runtime to the prediction. If the prediction is larger than the runtime, this reflects the fraction of predicted time that was actually used. But predictions can also be too short. Consequently, to avoid under- and over-prediction canceling themselves out (when averaged), accuracy is defined as $$\text{accuracy} = \begin{cases} 1 & \text{if } P = T_r \\ T_r/P & \text{if } P > T_r \\ P/T_r & \text{if } P < T_r \end{cases}$$

where P is the prediction; the closer the accuracy is to 1 the more accurate the prediction. This is averaged across jobs, and also along the lifetime of a single job, if the system updates its prediction. In that case a weighted average is used, where weights reflect the relative time that each prediction was in effect. More formally, a job J has a weighted accuracy of $$\sum_{i=1}^{N} A_i \cdot \left(\frac{T_i - T_{i-1}}{T_N - T_0}\right)$$

where T0 and TN are J's submission and termination time, respectively, and Ai is the accuracy of j's prediction that was in effect from time T(i−1) until time Ti.

According to one alternative embodiment of the present invention, system-generated predictions are used, in a backfilling scheduler, in place of user-provided estimates. Aside from serving as a runtime approximation, estimates typically serve as the runtime upper-bound (kill-time). But predictions might happen to be shorter than actual runtimes, and users cannot tolerate their jobs being killed just because the system speculated they were shorter than the user estimate.

An underprediction problem may result from the dual role each user's estimate conventionally plays: both as a prediction and as a kill-time. According to a preferred embodiment of the present invention, these functionalities are separated. It is legitimate to kill a job once its user estimate is reached, but not any sooner; therefore the main function of estimates is to serve as kill-times. All other scheduling considerations may be based upon the best available predictions of how long jobs will run; this can be the user estimate, but it can also be generated by the system, and moreover, it can change over time.

The system-generated prediction method shown and described herein may comprise the following steps: The prediction of a new job J is set to be the average runtime of the two most recent jobs that were submitted by the same user prior to J and that have already terminated. If no such jobs exist, the method falls back on the associated user estimate. Other ways to select the history jobs are also considered herein. If a prediction turns out higher than the job's estimate it is discarded, and the estimate is used, because the job would be killed anyway when it reached its estimate. Implementing this predictor significantly improves the accuracy of the data used by the scheduler.

Prediction Correction: A reservation computed based on user estimates will never be smaller than the start time of the associated job, as estimates are runtime upper bounds. This is no longer true for predictions, as they are occasionally too short. At the extreme, predictions might erroneously indicate that certain jobs should have terminated by now and thus their processors should be already available. Assuming there are not enough processors for the first queued job J, this discrepancy might lead to a situation where J's reservation is made for the present time, because the scheduler erroneously thinks the required processors should already be available.

Figure 4A:
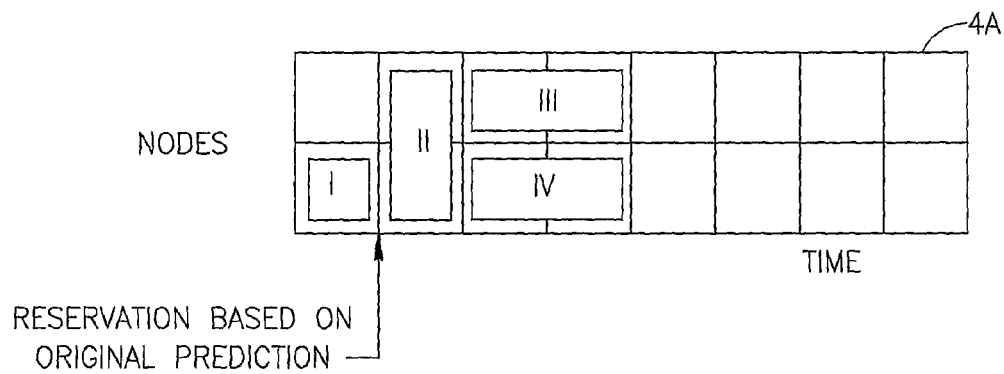
FIGS. 4A-4C are diagrams comparing scheduling with or without correction of run-time predictions as shown and described herein, FIG. 4A representing a scheduler's optimistic view, FIG. 4B representing a possible occurrence, and FIG. 4C representing a situation with corrected predictions.
Figure 4B:
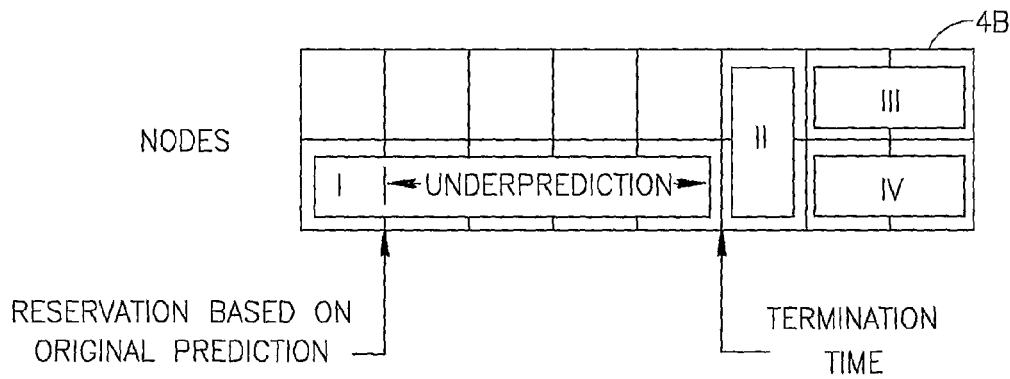
Figure 4C:
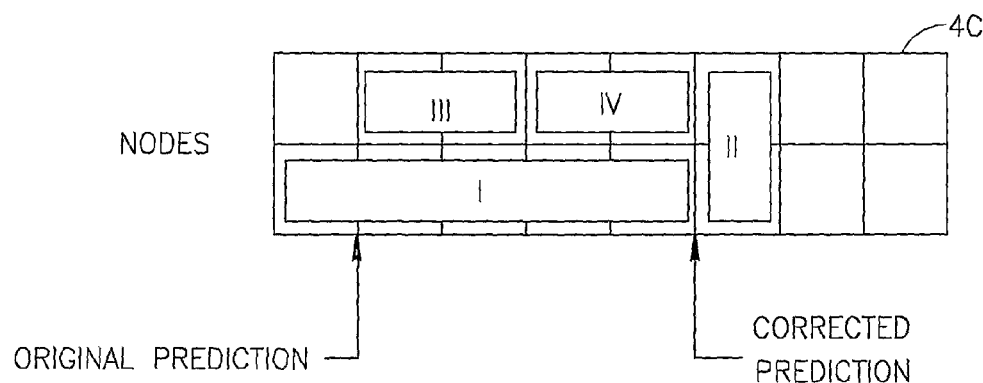

The backfilling window is between the current time (lower bound) and the reservation (upper). When these are made equal, backfill activity effectively stops, the only remaining backfilling activity taking place at the expense of the "extra" processors left over after satisfying the reservation for the first queued job. The scheduler largely reverts to plain FCFS, eliminating the potential benefits of backfilling (FIGS. 4A-4B). The solution is to modify the scheduler to increase expired predictions proven to be too short. For example, if a job's prediction indicates it would run for 10 minutes, and this time has already passed but the job is still running, a new prediction is generated e.g. by setting the new prediction to be the user's estimate. Once the prediction is updated, this affects reservations for queued jobs and re-enables backfilling (FIG. 4C). While this may undesirably delay the reservations made for queued jobs, such delays are still bounded by the original runtime estimates of the running (underpredicted) jobs.

In summary, as shown in FIGS. 4A-4C, underpredicting the runtime of job 1 causes the scheduler to make an early reservation for job II (FIG. 4A). This misconception prevents jobs III and IV from being backfilled (FIG. 4B). Correcting the prediction once proved wrong enables the scheduler to reschedule the reservation and re-enables backfilling (FIG. 4C)).

On rare occasions prediction correction is carried out even beyond the estimate, e.g. when in real systems, jobs sometimes exceed their estimates (Table 1):

|  | underestimated jobs | |
| --- | --- | --- |
| trace | number | % |
| SDSC | 4,138 | 7.7% |
| CTC | 7,174 | 9.3% |
| KTH | 478 | 1.7% |
| BLUE | 22,216 | 9.9% |

In most cases the overshoot is very short (not more than a minute) and probably reflects the time needed to kill the job. But in some cases it is much longer, for unknown reasons. Regardless of the exact reason, the prediction should be extended to keep the scheduler up to date (independent of the fact the job should be killed, and maybe is being killed). As most of these jobs only exceed their estimate by a short time, post-estimate predictions are enlarged in a gradual manner: The first adjustment adds only one minute to the old prediction. This will cover the majority of the underestimated jobs. If this is not enough, the $i^{th}$ prediction correction adds $15 \times 2\exp(i-2)$ minutes (15 min, 30 min, 1 h, 2 h, . . . ).

Comparison of Scheduling Methods:

Original EASY scheduling has been compared with a scheduling embodiment that includes prediction correction (EASYpcor), and a further embodiment that combines prediction correction with system-generated predictions (EASY$^+$). While EASYpcor employs user estimates as predictions, correction is still employed to handle the underestimated jobs discussed earlier. Prediction-correction by itself has only a marginal effect, because only a small fraction of the jobs are grossly underestimated. The value of prediction correction is revealed in EASY$^+$, where system-generated predictions are added: results show a significant and consistent improvement of up to 28%. In summary, historical information can be successfully used to generate runtime predictions for use within backfilling schedulers, without violating the contract with users. Moreover, the overhead is low, with predictions corrected only 0.1 times on average per job.

It is appreciated that obtaining the reported improvement is almost free and involves only creating predictions as the average runtime of the user's two most recent jobs and setting an alarm event to correct those predictions that prove too short. This scheme significantly improves the average accuracy, which can be up to doubled and is generally stabilized at 60-62% when using EASY$^+$.

Shortest Job Backfilled First (SJBF): A conventional scheduling principle is that favoring shorter jobs significantly improves overall performance. Supercomputer batch schedulers are one of the few types of systems which enjoy a-priori knowledge regarding runtimes of scheduled tasks, whether through estimates or system predictions. Therefore, SJF scheduling may actually be applied. Contemporary schedulers such as Maui can be configured to favor (estimated) short jobs, but their default configuration is essentially the same as in EASY. SJF is the default only in the PBS (portable batch system) resource manager and scheduler. This may perhaps be attributed to a reluctance to change FCFS-semantics perceived as being the most fair. Such reluctance has probably hurt previously suggested non-FCFS schedulers, that impose the new ordering as a "package deal", affecting both backfilling and reservation order. For example, with SJF, a reservation made for the first queued job helps the shortest job, rather than the one that has been delayed the most). In contrast, backfilling functionality and reservation order functionality are separated, according to a preferred embodiment of the present invention.

The scheme shown and described herein combines SJF and FCFS. Reservation order is defined as in FCFS (as in EASY) so that no job will be backfilled if it delays the oldest job in the wait queue. In contrast, backfilling is done in SJF order, that is, Shortest Job Backfilled First—also termed herein SJBF.

Applying SJBF to conventional EASY (i.e. using user estimates and no prediction correction) leads to typical improvements of 10-20%, and up to 42%. EASY$^{++}$ adds SJBF to EASY$^+$ (namely combines system-generated predictions, prediction correction, and SJBF). This usually results in double to triple the performance improvement in comparison to EASYsjbf and EASY$^+$. Performance gains are especially pronounced for bounded slowdown. There is also a 33% peak improvement in average wait. EASY$^{++}$'s accuracy is similar to that of EASY$^+$ at 60-62%.

If perfect predictions are used in conjunction with SJBF, prediction correction being meaningless here as predictions are always correct, PERFECT$^{++}$ is marginally to significantly better than EASY$^{++}$. The difference is believed to be more pronounced when the load is high. EASY$^{++}$ sometimes outperforms PERFECT$^{++}$ in average wait.

When load is artificially varied by multiplying all arrival times by a constant, PERFECT$^{++}$ is better than EASY$^{++}$, which is better than EASY$^+$, which is better than EASY. Higher loads usually intensify the trends described above, but the precise effect of the optimizations is very workload dependent. Prediction accuracy becomes crucial as load conditions increase, generating a strong incentive for developing better prediction schemes.

Predictability: As described above, on average, replacing user estimates with system-generated predictions is beneficial in terms of both performance and accuracy. However, when abandoning estimates in favor of predictions, there might be a loss of predictability: The original backfilling rules state that a job Jb can be backfilled if its estimated termination time does not violate the reservation time R1 of the first queued job J1. Since Jb is killed when reaching its estimate, it is guaranteed that J1 will indeed be started no later than R1. However, this is no longer the case when replacing estimates with predictions, as R1 is computed based on predictions, but jobs are not killed when their predicted termination time is reached; rather, they are simply assigned a bigger prediction. For example, if Jb is predicted to run for 10 minutes and R1 happens to be 10 minutes away, then Jb will be backfilled, even if it was estimated to run for (say) three hours. If the system's prediction turns out to be too short and Jb uses up its entire allotted three hours, J1 might be delayed by nearly 3 hours beyond its reservation.

Predictability is important for the support of moldable jobs that may run on any partition size. Such jobs trust the scheduler to decide whether waiting for more nodes to become available is preferable over running immediately on what is currently available. For example, an undesirable situation may occur in which the system decides to wait for (say) 30 minutes because it is predicted that 100 additional nodes will be available by then, only to find that the prediction was wrong. Predictability is also used to support advance reservations, used to determine which of the sites composing a grid is able to run a job at the earliest time, or to coordinate co-allocation in a grid environment, i.e. to cause cooperating applications to run at the same time on distinct machines.

The rate of jobs in need of a reservation has been consistently found to be reduced by 8-22% when predictions are used, indicating more jobs enjoy backfilling and reduced wait times. It is believed that using runtime predictions consistently and significantly improves predictability of jobs' starting time, relative to use of user estimates.

Improving the quality of reservations on average is desirable e.g. for grid co-allocation where it is important for a job to start exactly on time. However, some systems may care more about jobs being delayed beyond their reservation, then about jobs having started earlier. According to a preferred embodiment of the present invention, either or both of two embodiments may be employed for systems that do not tolerate delays. A first embodiment is to employ double booking: leave the internals of the methods based on predictions, while reporting to interested outside parties about reservations which would have been made based on user estimates (never violated if jobs are killed on time). This embodiment enjoys e.g. EASY$^{++}$'s performance but suffers from EASY's (in)accuracy. A second embodiment is to backfill a job only if both its system-predicted and user-estimated termination times fall before the reservation (which is based on estimates). This ensures backfilled jobs do not interfere with reservations, at the price of reducing the backfilling rate. The second embodiment enjoys all the benefits of the "+" scheduling schemes described herein, such as EASY+, in terms of accuracy, while being similar or better than EASY with respect to unwarranted delays. Its performance is 1-10% better than that of EASYsjbf.

EASY$^{++}$ outperforms X2 (i.e. EASY with doubled user estimates) by a wide margin for all traces and both metrics. EASY++ is also rather close to SJF scheduling in all cases, and sometimes outperforms it. The advantage over SJF is the fact that EASY$^{++}$ is fair, being based on FCFS scheduling with no danger of starvation. Also, the gap can potentially be reduced if better predictions are generated.

It is appreciated that the techniques shown and described herein can be used to enhance any backfilling method such as vanilla X2, SJF and "optimized" versions thereof. For example, in the X2+ scheduling method, in addition to doubling of estimates which can serve as fallback predictions when there's not enough history, X2$^+$ replaces estimates with (doubled) predictions, and employs prediction correction. X2$^{++}$ adds SJBF to X2$^+$. SJF$^+$ is similar to EASY$^{++}$ except that it allocates the reservation to the shortest (predicted) job, rather than to the one that has waited the most. When X2 is further optimizing by adding SJBF (X2$^{++}$), performance is consistently better, a typical improvement being 25-33%. The result of upgrading SJF to SJF$^+$ is inconsistent but improvements are more frequent (4-8% on average).

Doubling of improved predictions (whether perfect or based on history) yields better performance than when doubling the lower quality user runtime estimates. Predictors are preferably designed to make the best predictions they can and to leave the choice of whether to double or not in the hands of the scheduler. The choice is typically application-specific: if performance is more important than fairness, doubling is used whereas if performance is less important than fairness, doubling is not used.

The EASY$^{++}$ method shown and described herein has at least seven selectable parameters, described herein, that may affect performance. To evaluate the effect of different settings, simulation of all possible combinations ("configurations") of the seven parameters were conducted, using the four different workloads described above. Each combination yielded two performance metrics. Thus, each configuration is evaluated by eight test cases ({SDSC,CTC,KTH,BLUE} X {waiTime, boundedSlowdown}). Results indicate that the "performance surface" is extremely noisy. There are many different and seemingly unrelated configurations that achieve high performance, but there is no single configuration that is best for all eight test cases. A joint analysis of all the data traces was performed so as to find a "best" configuration providing robust good performance under all eight test cases. It is anticipated that such a configuration will also perform well under other conditions, e.g. with new workloads.

The analysis performed began by ranking all configurations in two steps. First, the degradation in performance of each configuration c was evaluated under each test case t relative to the best configuration for this test case. If P_b and P_c denote the performance of b and c respectively under t, then c's degradation under t is 100 {P_c}/{P_b}−100). Thus, each configuration is now characterized by eight numbers reflecting its relative performance degradations under the eight test cases. In the second step these eight values are combined e.g. averaged and the configurations are ranked accordingly (1 is the best and has the lowest average degradation; 2 is second best, and so on). The purpose is to identify robust configurations, the robustness manifesting itself in immunity to trivial changes and to small modification. This purpose may be realized by searching for a contiguous subspace within the configuration space, such that all its configuration-population yields good results.

Referring now to FIGS. 5A-5G illustrating distributions of the seven parameter values respectively, it is seen that the parameters which affect performance of the EASY++ method are often concerned with the definition of the history window: which previous jobs to use, and how to generate the prediction. The first parameter is how to perform prediction correction (when the predicted termination has arrived but the job continues to run). One option is to simply revert to the original user estimate. Other options are to grow the prediction gradually, e.g. by predefined increments, or in an exponential manner (by adding e.g. 20% each time). The results (FIG. 5A) clearly indicate that it is best to jump directly to the full user estimate, and not to first try lower predictions, as this option dominates 90% of top-ranked configuration. This is probably so because using the full user estimate opens the largest window for backfilling. Using a gradual increase is especially bad, and dominates the bottom half of the ranked configurations.

When a prediction cannot be generated due to lack of historical information, the user estimate is used as a prediction fallback. The estimate can be used as is, or it can be relatively scaled according to the accuracy the user had displayed previously. The results (FIG. 5B) show that relative provides a slight advantage, as it appears more often in high ranking configurations.

The next two parameters turned out not to have decisive values, at least not when considered in isolation (FIGS. 5C and 5D). Propagation refers to the action taken when new data becomes available. For example, if a prediction is made for a newly submitted job, and later a previous job terminates, should the prediction be updated based on this new information? The following parameter, as shown in FIG. 5D, is window fullness. The window is the set of history jobs that is used to generate predictions. The two options are to allow a partial window, meaning that a prediction is made based on whatever data is available, or to require a full window and use the user estimate as a fallback if enough jobs are not available. For both these parameters, the possible values are approximately evenly spread across the ranked configuration. The slight advantage of propagation seems not enough to justify its computational complexity. On the other hand, partial is significantly better when larger prediction windows are employed (not shown).

The last three parameters are shown in FIGS. 5E, 5F and 5G. The parameter of FIG. 5F is the prediction metric. Given a set of history jobs, how should a prediction be generated? Four simple options are to use the average, median, minimum, or maximum of the runtimes of these jobs. Evidently, minimum tends to lead to a low-ranking configuration, and the maximum to a middle rank. The average and the median share 80% of the top-ranked configurations, leaving the question of which one should be used.

FIG. 5E's parameter is termed the window type. The three types are all, meaning that all recent jobs are eligible, immediate, meaning that recent jobs are used only if they are similar to the new job (same estimate), or extended, meaning similar jobs are used even if they are not the most recent (using the entire user history). The problem is that the all distribution has a U shape: it accounts for more than half the top-ranked configurations, but also for two-thirds of the lower-ranked ones.

How to set the window size (the number of history jobs to consider—FIG. 5G): It is believed that while smaller windows are more common in high-ranking configurations, there is no range-size that can be said to dominate high-ranking configurations.

Regarding the window type parameter, there are the following advantages to using the all window type: First, its evident top ranking peak. Second, it is easier and more efficient to implement, by keeping a record of the runtimes of the last terminated (and most recently submitted) jobs by the user, with no need to check for job similarity. The problem is that many configurations that employ an all window type are low ranking. To avoid these, the other parameter values are preferably appropriately selected: using an all window-type in combination with estimate prediction correction and a small window size (<7), eliminating more than 99% of all's tail configurations and making it the best choice. This subspace seems to meet robustness demands, as is shown in FIG. 6A. Accordingly, the window size of the chosen subspace is preferably <=3. FIGS. 6B-6F pertain to the remaining parameters within this subspace. Average is a preferable metric. Additionally, 1-2 sized windows are preferable over 3, 1 and 2 being equally preferable because size=2 dominates the top (50%) but the worst-case of size=1 is better than that of size=2. As there are also no clear winners within the other parameters, preferred parameterization is summarized in Table 2 below, which matches the prediction methods shown and described herein. The minimal, maximal and average degradation for size=1 configurations within our subspace are 11.7%, 15.3% and 14.2%, respectively. The matching size=2 statistics are 12%, 14.7% and 13.4%

TABLE 2

Suggested parameter settings for the EASY++ method.

| parameter | description | Suggestion |
|---|---|---|
| job selection | which jobs to include in the window | All |
| metric | how to generate predictions | Average |

It is believed that recency is more important than similarity such that it is better to use the last job by the same user than to search for the most similar job. This implies that the overheads for storing and searching through data about different classes of history jobs can be avoided altogether.

The default setting of most production parallel job schedulers is FCFS with backfilling. Under this setting, users must supply job runtime estimates, which are known as being highly inaccurate and inferior to system generated predictions. Recent research revealed how to utilize system predictions for backfilling, and this potential performance gain motivates searching for better prediction techniques. Three prediction techniques are described using decreasing levels of information as is suitable for the situation at hand. The first is based on "user sessions": continuous temporal periods of per-user work. This method exploits the entire long-term historical data of the workload, along with user runtime estimates. The second is "estimation-less", that is, uses historical data only, relieving users from the annoying need to supply estimates. The third is completely "information-less" and is suitable for cases in which neither historical information nor estimates are available, as happens in some grid environments.

Referring again to FIGS. 2A-2B, the three prediction functionalities illustrated therein which are merely examples of the many suitable prediction functionalities falling within the scope of the present invention, utilize a decreasing amount of information as is suitable for the situation in question and preferred embodiments thereof are now described in detail:

1. Session based method. This method uses all the information available to traditional backfill schedulers, namely accumulated historical data about users and the user runtime estimates of submitted jobs. It is based on user sessions—identifying consecutive temporal work periods of users and basing the predictions on the jobs populating these sessions.
2. Estimation-less method. Differs from the session based method in that it does not employ user estimates.
3. Information-less method. This predictor does not base its predictions on any past or present information. Such a predictor is often useful in the context of grid, where a local scheduler must schedule a remote job. The history of the job's user will usually not be available, since the user's jobs ran on multiple machines, and the available job attributes may vary according to the grid's protocols.

The above combination of prediction methods in a backfill scheduler provides a complete scheduling solution that improves the bottom-line performance of current systems, in addition to improved accuracy. This solution is usable in systems which serve a mix of the above three situations—for example, a local system also serving some remote requests, or featuring optional user estimate.

According to a preferred embodiment of the present invention, predictors all obey a standardized interface (e.g. the interface of Listing 1).

Listing 1

```
struct Prediction {Job job, int prediction}
list<Prediction> onJobArrival (Job job)
list<Prediction> onJobStart (Job job)
list<Prediction> onJobTermination (Job job)
list<Prediction> onJobDeadlineMissed (Job job)
```

A standardized predictor interface allows schedulers to easily incorporate any previously implemented predictors, regardless of their complexity.

The parallel computers described herein use variable partitioning, however this is not intended to be limiting. Upon submittal, a user specifies the number of processors the job requires. The job is then placed in a queue until enough resources are available; then, it is assigned the processors it needs for its exclusive use and runs to completion. Most parallel job schedulers today—including IBM's LoadLeveler, Maui, Moab and others use a scheduling functionality termed herein "EASY" as their default settings. The backfilling optimization employed by EASY allows jobs to leapfrog over the first queued job provided they do not delay it, i.e. run beyond the shadow time, as shown in prior art FIG. 3. As best seen in FIG. 3, EASY scheduling reduces fragmentation by using backfilling. The numbering shown in FIG. 3 indicates jobs' arrival order. As shown, it would be impossible to backfill job N had its length been more than 2 time units, because backfilling job IV would have delayed job III.

Figure 7:
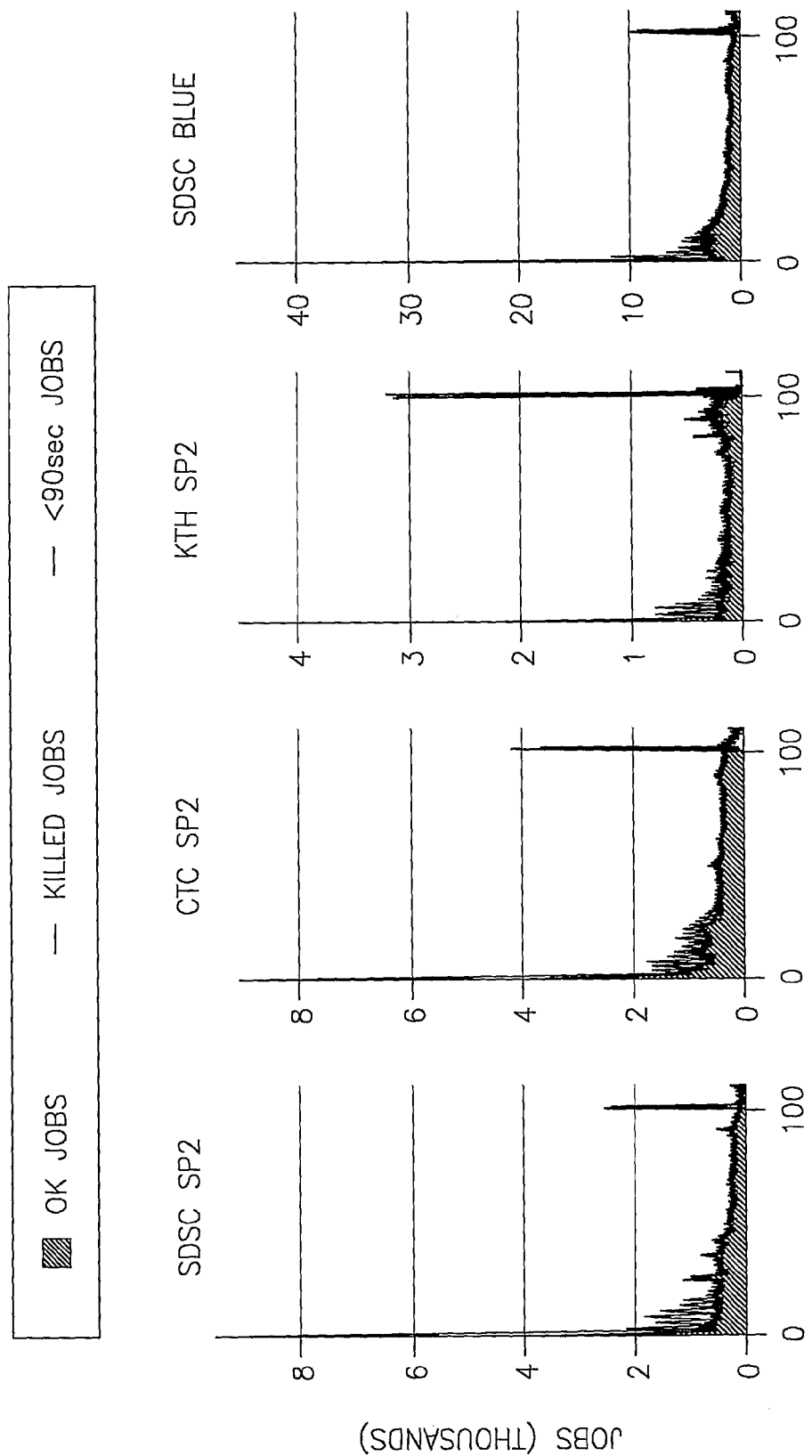
FIG. 7 is a graph illustrating the inaccuracy of user estimates, where accuracy=100*runtime/estimate.

Empirical studies have shown that user estimates are generally inaccurate as reproduced in prior art FIG. 7. The seemingly promising peak at 100% unfortunately reflects jobs that reached their allocated time and were then killed by the system. The hump near zero reflects jobs that failed on startup. The rest of the jobs, that actually ran successfully, have a flat uniform-like histogram, meaning that for such jobs, any level of accuracy is almost equally likely. FIG. 7 includes accuracy histograms of user runtime estimates on four production systems. The reason that user estimates are usually poor may be that users find the motivation to overestimate, so that jobs will not be killed, much stronger than the motivation to provide accurate estimates and enable the scheduler to perform better packing. However, a recent study indicates users are confident about their estimates and probably would not be able to do better.

Figure 8:
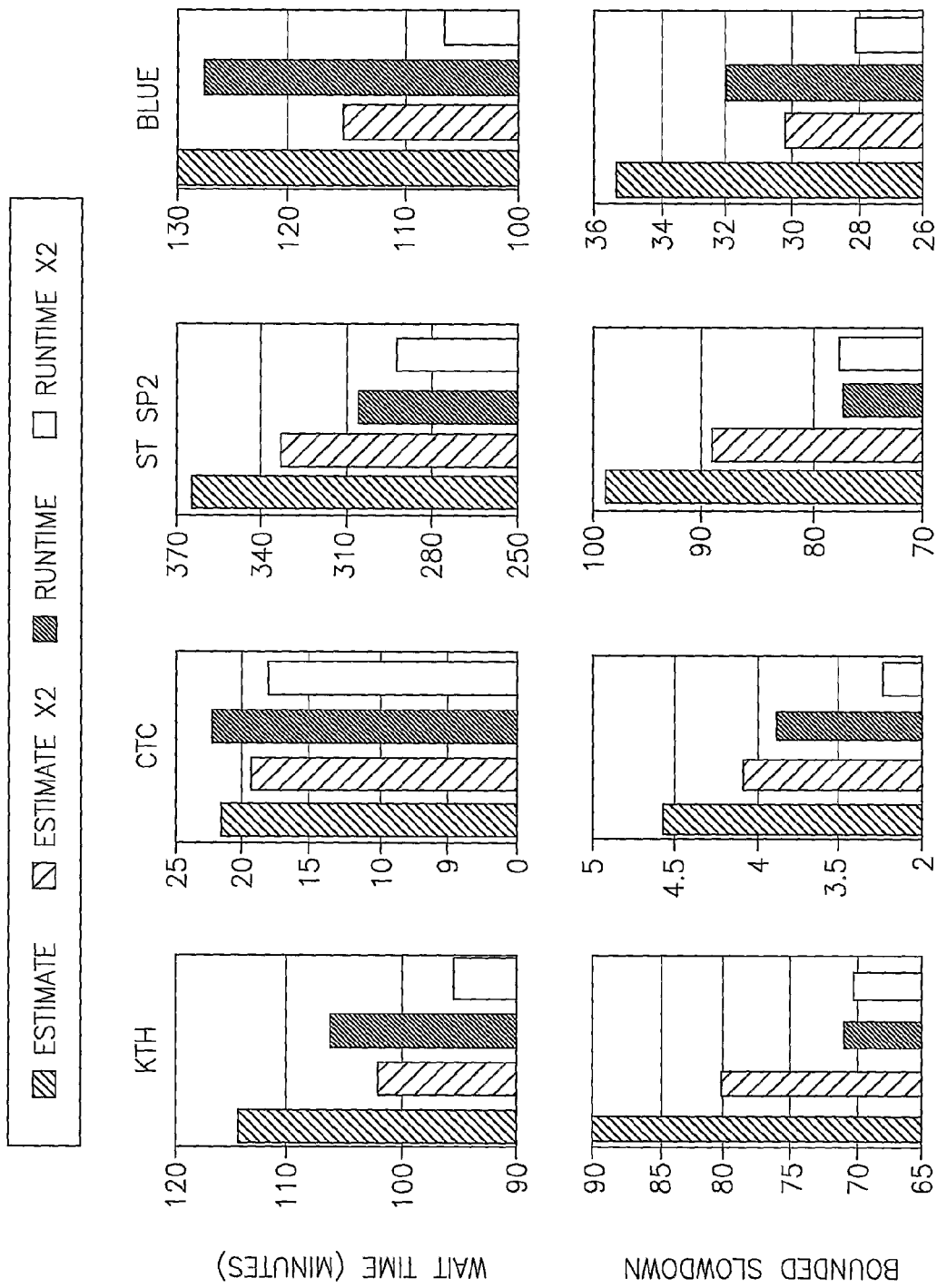
FIG. 8 is a prior art graph ostensibly showing that scheduling with backfilling is more effective as user estimates become less accurate though doubling of better predictions yield better results.

Until recently, motivation for devising runtime prediction methods and incorporating them into production schedulers was limited for two reasons: Findings which suggested that accuracy hinders performance, instead of improving it; and lack of other needs for accuracy. However, several studies have found a surprising yet consistent result: EASY performs better if estimates are doubled, which means performance is actually improved if estimates are made even less accurate. This is shown in prior art FIG. 8 by bars associated with user estimates allegedly suggesting improved accuracy negates performance. FIG. 8 is a prior art figure comparing performance of EASY scheduling under different runtime predictions: user estimates, actual runtimes, and both doubled.

In fact it is incorrect that improved accuracy negatively affects performance as described above and as demonstrated by bars associated with actual runtimes in FIG. 8. Indeed, doubling improves performance. Doubling improves performance wherein the first queued job is delayed beyond its designated start-time due to shorter jobs that are implicitly prioritized. This effect can be partially emulated without this delay, if instead of doubling, shorter jobs are explicitly backfilled first, which is termed herein Shortest-Job-Backfilled-First scheduling (SJBF).

In addition to being inaccurate, estimates embody one additional characteristic that is particularly harmful for backfilling performance: they are inherently modal. Users tend to choose "round" values such as "one hour" as estimates, resulting in 90% of the jobs repeatedly using the same 20 values. Such modality significantly limits the scheduler's ability to exploit existing holes in the schedule. Most notable is the maximal allowed value which is always very popular, despite the fact that jobs which use it are usually short. For example, one study found that roughly a quarter of the jobs used this value. Such jobs are never backfilled, hindering overall performance.

In addition for the motivation to improve performance, two other developments raise the requirement for accurate predictions of parallel jobs. The first is advanced reservation for grid co-allocation, which has been shown to benefit considerably from better accuracy. Knowing in advance when remote processors will be available is crucial for making reservations work.

The second is scheduling of moldable jobs that can utilize any number of processors. For such jobs the goal of the scheduler is to minimize response time, thus it must decide whether it is preferable to start running a job on the processors that are available now, or wait for more processors to accumulate. A good prediction of how long current jobs are expected to run is important in order to make a correct decision.

A scheduler is an event-based program, where events are job arrival or termination. Upon arrival, the scheduler is informed of the number of processors the job needs and its user estimated runtime. It can then simulate the job's execution or place it in a queue. Upon termination, the scheduler is notified and can schedule other queued jobs on free processors. A runtime prediction method is also an event-based program, used internally by a scheduler to handle e.g. four events as specified in Listing 1 above which is an example of a standardized interface for a predictor.

In each of the events appearing in Listing 1, more information is available to the predictor, so it may decide to adjust the predictions of zero or more jobs (whether waiting or running). It therefore returns a list of updated predictions for these jobs, which may be empty. The only constraints are that a prediction must be given for a job on its arrival, must be given when a job has missed its deadline (meaning that it is still running, but its runtime has just exceeded its current prediction), and must be bigger than the job's current runtime, if it already began to run.

The simplest predictor would return a job's estimate upon its arrival and an empty list upon its start and termination (there will be no deadline misses, because a job is killed once its user estimate is reached). A scheduler that uses the above interface may quickly replace and utilize any new predictor that obeys this interface, e.g. any of the predictors shown and described herein.

A scheduler preferably complies with the following criteria:

The scheduler's performance should improve when the predictor's accuracy is improved.

The scheduler should maintain accepted fairness norms, and not be subject to starvation.

The scheduler should be practical—easy to implement and integrate in current systems.

Shortest-Job-Backfilled-First (SJBF) is a scheduler complying with the above criteria. It is generally similar to EASY, except that it:

Uses predictions instead of user estimates to compute the shadow time.

Uses predictions instead of estimates to test if a job terminates before the shadow time.

Backfills jobs in order of ascending predictions (shortest job first), instead of ascending arrival time (first come first serve).

SJBF explicitly prioritizes shorter jobs, which makes the benefit of improved accuracy most pronounced and does so without scarifying fairness.

Performance is measured herein in terms of average wait time of jobs and bounded slowdown, as is conventional.

Defining and measuring accuracy of prediction is sometimes difficult for one or more of the following reasons. First, since a prediction may be lower than a job's actual runtime, it may have to be changed during its execution—so one job can have several different predictions during its lifetime. Second, since most prediction methods rely on history, they must rely on the list of terminated and running jobs—which means that their accuracy also depends on the scheduler being used, in addition to the workload. Third, different metrics may be sensitive to different aspects of accuracy, as is the case in performance metrics. For example, the slowdown and wait time metrics do not always agree, as the former is dominated by short jobs and the latter by long ones. Therefore, more than one metric is often employed.

Two accuracy metrics are employed herein: absolute inaccuracy, defined as the absolute difference between the prediction and the actual runtime (analogous to wait-time and similarly desired to be as small as possible), and relative accuracy, defined as the ratio of runtime to prediction (analogous to slowdown). When analyzing a full log, the averages of these metrics may be considered, which means relative accuracy is dominated by short jobs, while absolute inaccuracy is dominated by large prediction errors. To avoid under- and over-predictions canceling each other out when relative accuracy is averaged, the smaller value is typically set to be the numerator in the ratio, and so, relative accuracy is always within 0% to 100%. The following Equation 1 formally defines the two metrics.

| $AI = \lvert R - P \rvert$ | $RA = \begin{cases} 1 & \text{if } R = P \\ R/P & \text{if } R < P \\ P/R & \text{if } R > P \end{cases}$ |
|---|---|
| Absolute Inaccuracy (AI) | Relative Accuracy (RA) |

In Equation 1, R stands for the job's actual runtime and P stands for its associated prediction. These definitions only work for jobs that have a single prediction throughout their lifetime. In the frequent case of under-predictions (and upon any other prediction update initiated by the predictor), jobs' predictions change. Therefore, its average weighted accuracy is typically employed. Weights are determined according to the durations in which each prediction was in effect. Formally, if $T0$ and $TN$ are a job's submission and termination time, and $A_i$ is its accuracy (absolute or relative) from time $T_{i-1}$ to $T_i$ (where $T_i \leq T_{i+1}$), then its average weighted accuracy may be defined by the following Equation 2:

$$A = \frac{1}{(T_N - T_0)} \cdot \sum_{i=1}^{N} A_i \cdot (T_i - T_{i-1})$$

Any of the following existing prediction methods may serve as metrics to be used as references. The first existing method is the perfect predictor, which guesses the actual runtime. This is a theoretical, optimal predictor, since the actual runtime is not known in advance. The second predictor is the constant predictor: predict the same, constant runtime for all jobs. This predictor is a reference to what can be achieved with no information, in contrast to Perfect which has full information. The third predictor is the estimate predictor: use the user estimate as the prediction. Formally:

---

Listing 2. Reference Predictors

PERFECT Predictor: OnJobArrival return <job, job.runtime>
CONSTANT Predictor: OnJobArrival return <job, Constant>
ESTIMATE Predictor: OnJobArrival return <job, job.estimate>

---

SJBF with the Estimate Predictor is different from the original EASY in two aspects. First, it backfills jobs by order of ascending estimates, instead of ascending arrival time (FCFS). Second, it updates its prediction on deadlines misses—events in which the job's runtime exceeds its prediction. This can happen if a job's runtime exceeds its estimate, which happens rarely, and may be handled by gradually increasing the prediction by predefined increasing values. This is also the strategy used in the Constant Predictor, if the runtime exceeds the constant. All other predictors described herein use the following strategy: If a deadline is missed and the current prediction is smaller than the user estimate, then raise it to be equal to the user estimate; else, raise it by the predefined gradual increments.

The fourth predictor used as a reference herein is the Recent User History Predictor, described hereinabove, also termed herein EASY++, is believed to be a well performing scheduler/predictor combination abiding by the above-described criteria. EASY++ is based on SJBF and predicts runtimes based on the following "recent user history" rule: A job's prediction is the median of the runtimes of the three last jobs of the same user as described below in Listing 3.

Listing 3

```
OnJobArrival:
    if there exist at least three terminated jobs of job's user then
        return [job, median of last three terminated jobs of job's user]
    else
        return [job, job.estimate]
```

The RUH (recent user history) Predictor can be configured by several parameters, underlined in the above pseudo-code: how many past jobs to consider, which metric to use on them, should running or only terminated jobs be considered, and how to handle the first jobs of a new user. This predictor is simulated herein under its best published parameter configuration, in two variants—with and without propagation. Propagation is an optional optimization, which forwards new information on a job, typically its actual runtime when it terminates or its updated prediction on a deadline miss event, to the remaining waiting and running jobs of the same user. The predictions of these jobs are then recomputed based on the updated information.

Table 3 shows Performance and accuracy gain of SJBF with reference predictors over EASY:

TABLE 3 shows Performance and accuracy gain of SJBF with reference predictors over EASY:

| Predictor: | Improvement over EASY, Average over all logs: | | | |
|---|---|---|---|---|
| | Wait Time | Bounded Slowdown | Absolute Inaccuracy | Relative Accuracy |
| Perfect | 22% | 47% | 100% | 176% |
| Estimate | 11% | 22% | 0% | 0% |
| RUH without Propagation | 18% | 32% | 40% | 69% |
| RUH with Propagation | 17% | 32% | 41% | 71% |

Figure 9A:
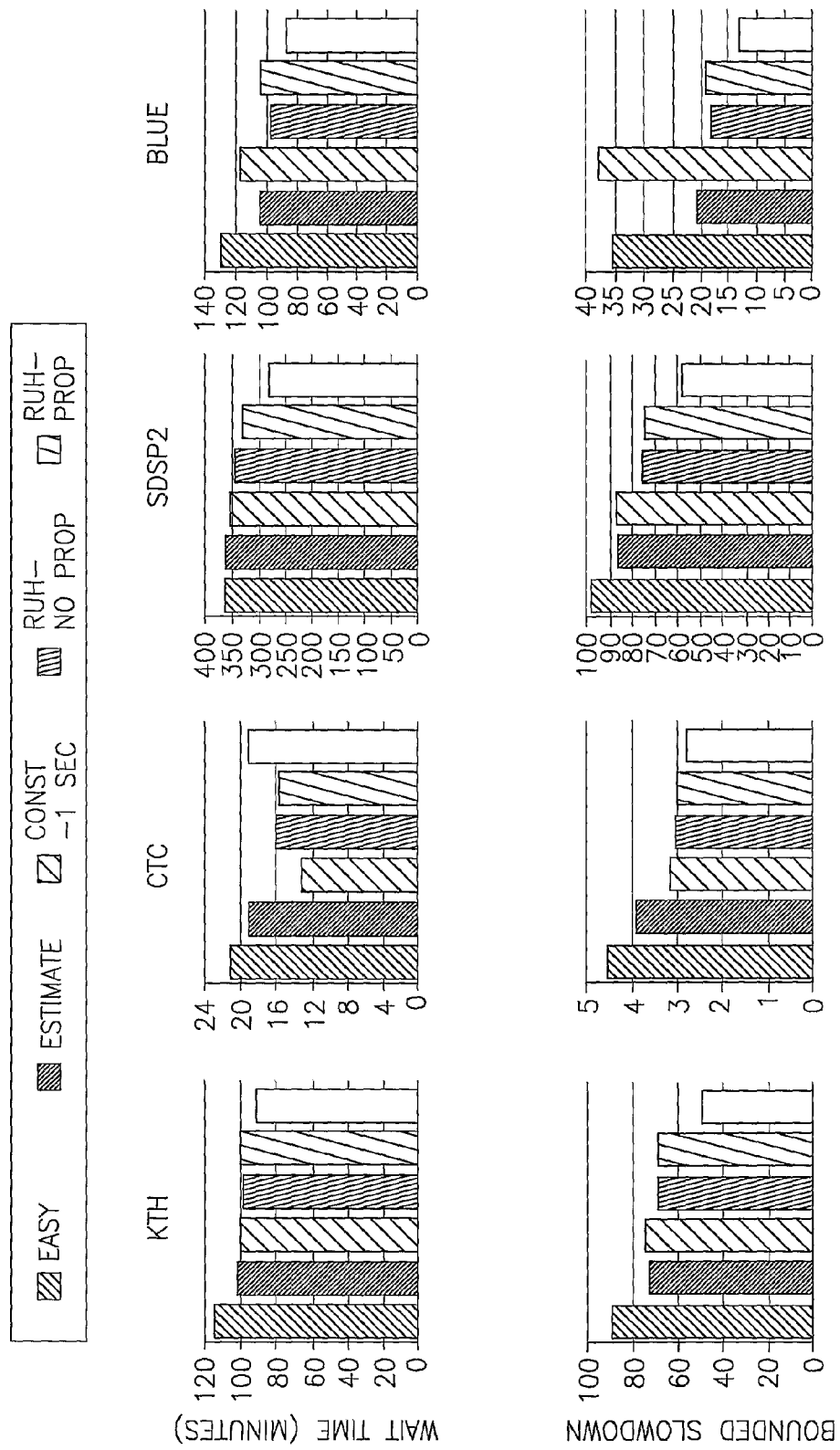
FIG. 9A is a graphed comparison of several reference predictors using wait time and bounded slowdown as bases for comparison.
Figure 9B:
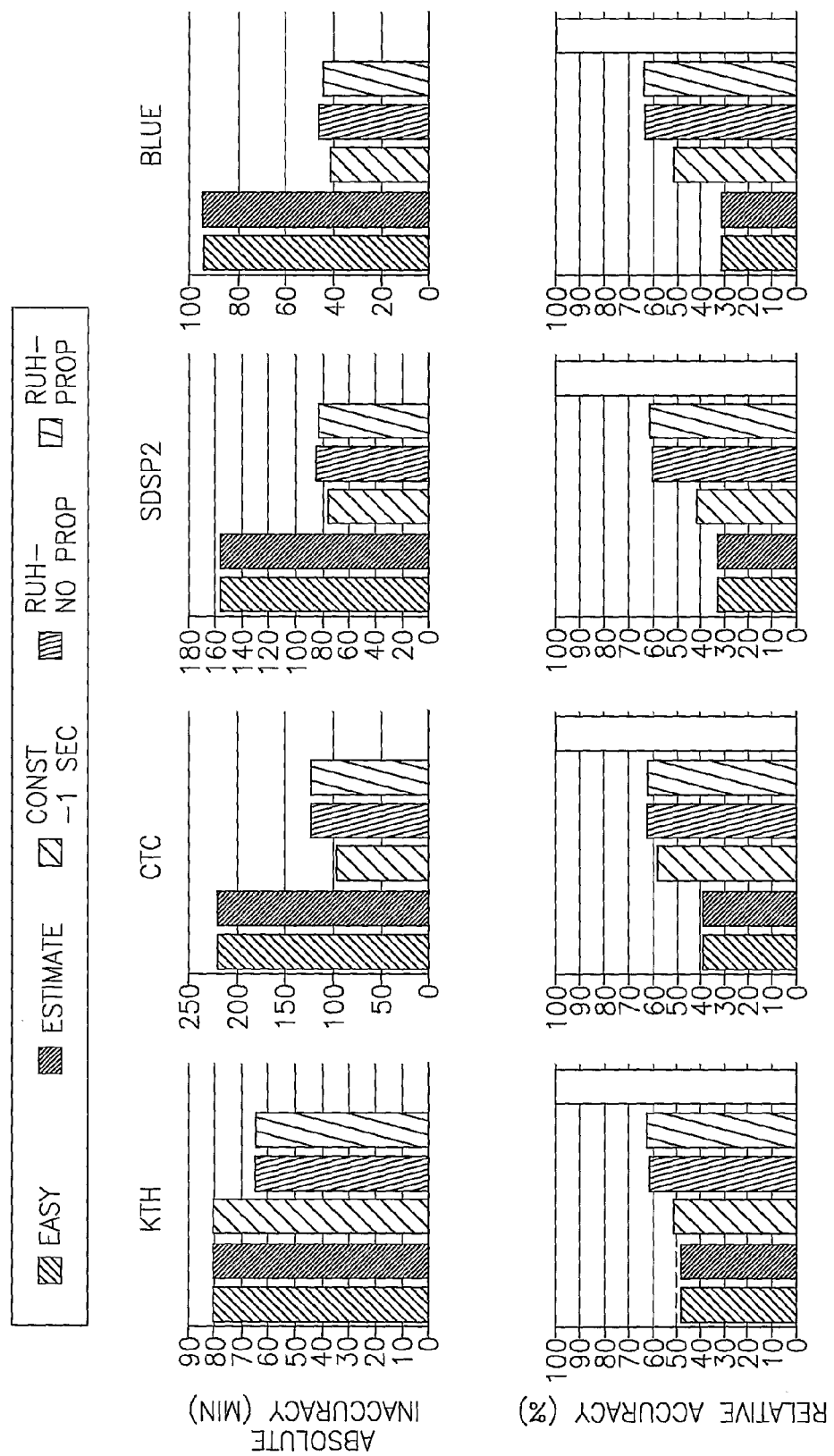
FIG. 9B is a graphed comparison of several reference predictors using absolute and relative inaccuracy as bases for comparison.

Table 3 and FIG. 9 compare the reference predictors. As shown, EASY is substantially inferior to SJBF, even under the Estimate predictor. RUH behaves almost the same with and without propagation, and improves both performance and accuracy further, up to about two thirds of the potential gain, as assessed by the results of the Perfect predictor.

Human users typically work in sessions—periods of intense, repetitive work. Five stable clusters of sessions have been identified in parallel workloads. It was also found that in four of the session clusters, consisting of over 95% of the observed sessions, the variance between jobs in the session is very small e.g. a median of less than two unique runtimes and levels of parallelisms within a session. This is believed to cause the Recent User History Predictor to be successful. According to a preferred embodiment of the present invention based on these findings, a predictor may be based directly on sessions as described hereinbelow in detail.

It is believed that runtimes are easy to predict based on history, but on the other hand have no correlation to the user estimate. It is also believed the user sometimes hints about changes in runtime by changing the number of processors, the estimate, or the executable. Therefore, the session-based predictor preferably uses both proximity in time and similarity in job attributes to decide on which jobs a new prediction should be based.

A Session-Based History (SBH) Predictor constructed and operative in accordance with a preferred embodiment of the present invention preferably operates as follows. It maintains each user's past jobs partitioned by sessions, where two jobs are defined to be in the same session if the think time between them (the time between the termination of the first one and the arrival of the next) is smaller than twenty minutes. This threshold is taken from a sensitivity analysis study which showed that it is stable to changes within the same order of magnitude. Different thresholds, including ones far different from 20 minutes, sometimes show comparable performance, but cannot be used to obtain consistent superior performance or accuracy. All simulation results presented here use the 20-minutes value.

In addition, the SBH Predictor employs an ordered list of similarity criteria, by which jobs in a session are matched to the job for which a prediction is required. Each criterion defines whether the number of processors (P), the user estimate (E), or the executable (X) should match; the method only uses jobs that match the given criterion to generate a prediction. For example, if the criteria list is [PEX,PX,EX], then the method typically first looks only for jobs that match the new job in parallelism, estimate, and executable; if there is no such job in the current session, it looks for jobs that match in parallelism and executable; and if there is no such job as well, it looks for jobs that match in estimate and executable. If no matching job is found at all, then the method repeats the search in the previous sessions, in descending order. If no matching job is found in any session (for example, in the first job of a new user, or when a user starts working with a new executable), the method resorts to using the user estimate as the prediction. This embodiment of a session-based history predictor is described in Listing 4:

Listing 4.

```
OnJob Arrival (Job job):
    for each criterion in the similarity criteria list
        for each of the last three sessions of job's user,
        ordered by descending start time
            if there exists at least one terminated job in session,
            which matches the current similarity criterion, then
                return <job, median of all matching jobs in
                    session>
    // (following line is only reached if no match was found)
    return <job, job.estimate>
```

The method can be configured in several ways, as is evident from the above pseudo-code. One influential parameter is the similarity criteria list, since it defines the balance between predicting by exact matches, and not being able to predict at all (when the criteria is too strict). Another influential parameter is the order of the method's two loops. The method as explained above and defined in Listing 4 uses "Depth-First Search" (DFS): Its first priority is to find an exact match to the current criterion, at the expense of relying on the farther past. For example, if the setting is [PEX,PX,EX], then this method prefers to predict based on a job that matches in parallelism, estimate, and executable three sessions ago, rather than predict based on a job that matches only in parallelism and executable from the current session. An alternative strategy would be "Breadth-First Search", in which the two loops are exchanged, and the method first looks at the current session for any match to the similarity criteria list, and only searches past sessions if no match is found. Similarly, many other variations are possible; the SBH Predictor can be configured in a vast number of ways.

TABLE 4 illustrates best SBH configurations and their gain over RUH:

| Configuration: | Improvement over RUH, Average over all logs: | | | |
|---|---|---|---|---|
| | Wait Time | Bounded Slowdown | Absolute Inaccuracy | Relative Accuracy |
| Unlimited DFS, [PE, P, E, *], Propagation | 5% | 4% | 5% | 2% |
| Unlimited DFS, [E, P, X], Propagation | 4% | 8% | 9% | 3% |

Figure 10A:
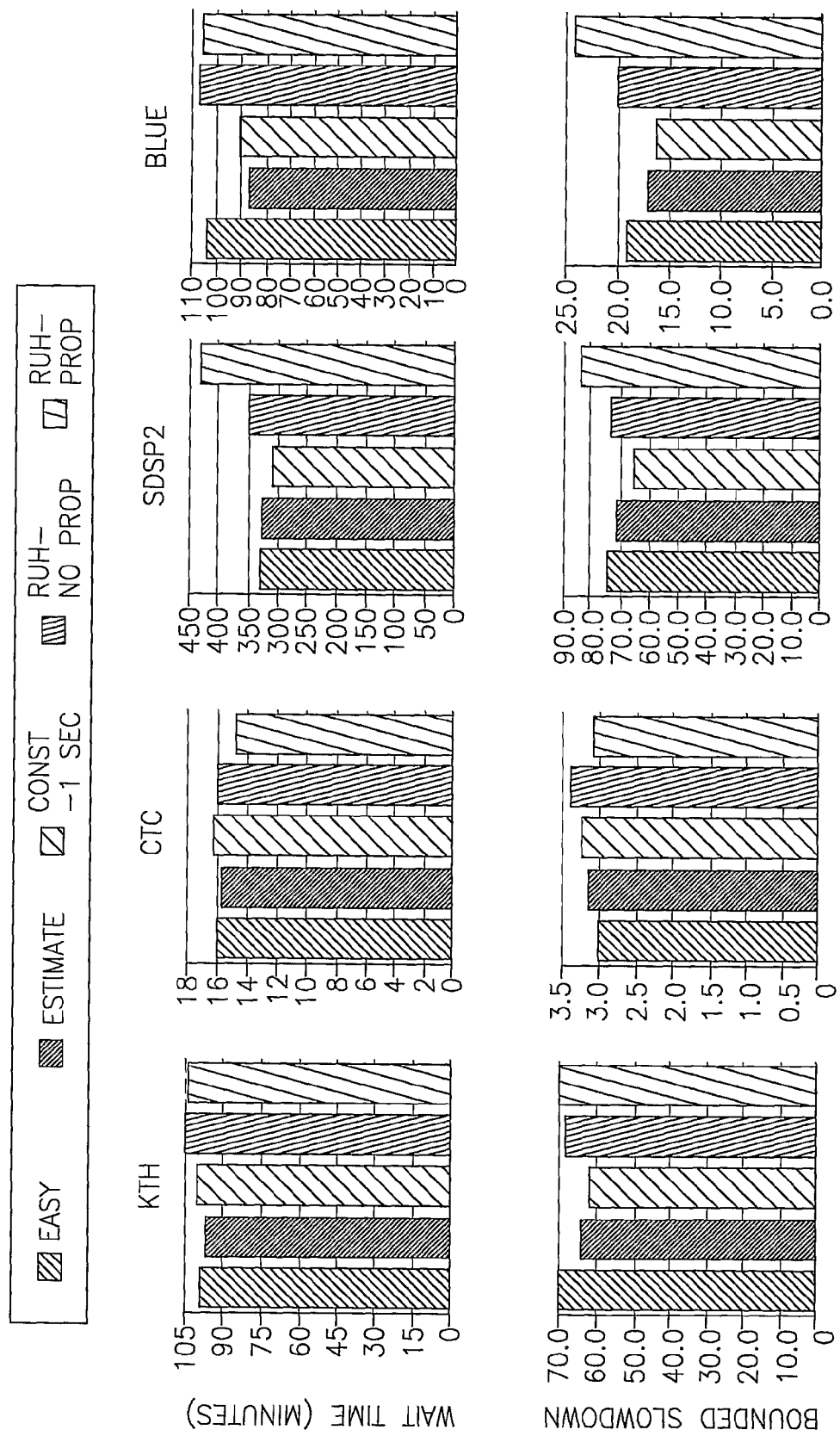
FIG. 10A is a graphed comparison of additional predictors using wait time and bounded slowdown as bases for comparison.
Figure 10B:
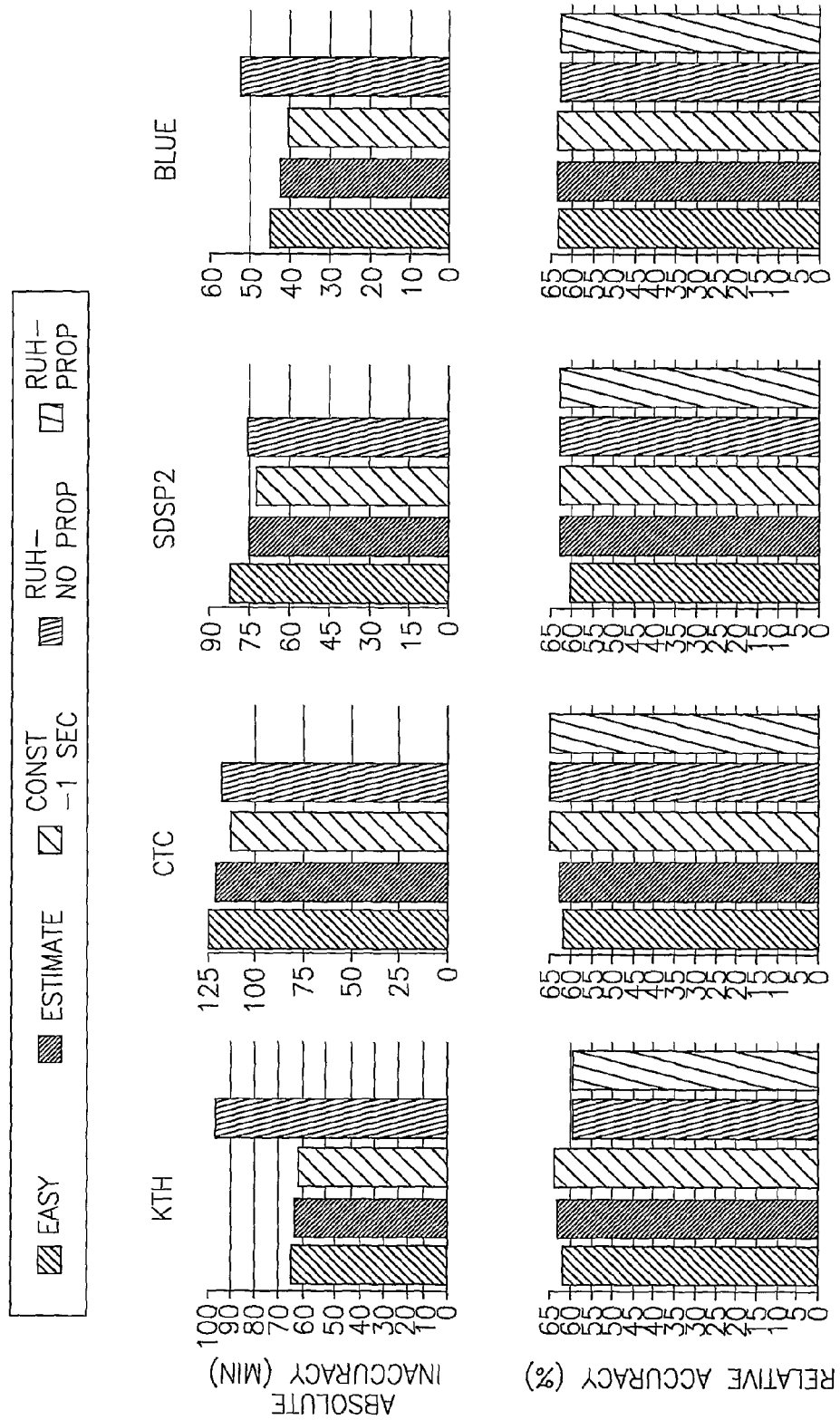
FIG. 10B is a graphed comparison of additional predictors using absolute and relative inaccuracy as bases for comparison.

Table 4 and FIGS. 10A-10B compare the performance and accuracy of RUH with two well performing SBH configurations and indicate that the latter yield an improvement over the best RUH configuration comprising a 24% gain in wait time and 47%-53% gain in absolute inaccuracy over conventional EASY-based schedulers.

Other properties of the session-based predictor are now described. Preferably, design of other predictors, as well as session-based analysis of parallel workloads, take these properties into account:

Searching in sessions far back in history is useful. In contract to the RUH Predictor, SBH prediction may require a user's entire history to work optimally. Limiting the method to look for less than 10 sessions back deteriorates performance, and surprisingly, even limiting the method to 30 sessions results in performance that is 2%-3% worse, in all logs, than that of the equivalent unlimited configuration. Only a small fraction of a system's users even have that many sessions, so the effect may be caused by better understanding of these few extremely active users.

Depth-First Search is significantly better than Breadth-First Search. Over a large set of simulations, DFS performed better than the equivalent BFS configuration in over 90% of the cases. The average gap in favor of DFS, over all four logs, was 5% in average wait time and 17% in average absolute error. This occurs even though DFS is used to unlimited depth (not just 3 sessions back). In other words, basing a prediction on an exact match that is five months old is better than basing it on an approximate match that is five minutes old.

Session-Based Prediction based on proximity in time alone in not enough. Using similarity criteria such as [*] (match any job) or [PEX,*] resulted in performance that is even worse than that of RUH. It is believed that separating sessions by means of the think time between jobs alone is not enough to distinguish between different activities of the user, at the level of precision that is required for accurate runtime prediction.

Exact similarity is believed to be more important than proximity in time for runtime prediction. Therefore, the session-based predictor preferably uses a full history of a parallel workload.

Propagation is generally better than non-propagation. Enabling propagation means taking advantage new information sooner. Using this optimization was preferable in 75% of the cases, resulting in an average improvement of 10% in average wait time and 6% in average absolute error.

The Session-Based Predictor shown and described hereinabove uses all the available information about a job to predict its runtime. Other session-based predictors are now described which are suitable for the case in which user estimates are not available. These alleviate the need to obtain estimates from users, and are also useful in situations where estimates are simply not available, or not available for all jobs.

Session-Based Predictors comprise the highest performing predictors to date that do not use user estimates, since SBH relies on estimates less than previous methods. By measuring the performance and accuracy loss caused by discarding estimates, informed decision becomes possible. To build a No-Estimate SBH Predictor, user estimates are preferably replaced in the three places where they are potentially used:

a. As a default prediction in case no matching past job is found (the last line in Listing 4 is reached). This happens in slightly less than 1% of the jobs in the predictors described herein. The estimate can be replaced here by always predicting 1 second (i.e. by applying the Constant predictor). The "Constant" configuration for which results are reported herein uses an initial prediction of 1 second for all jobs, and multiplies the current prediction by 10 (ten) each time the actual runtime exceeds the current prediction.

b. As a strategy for dealing with missed deadlines, when the job's current runtime is smaller than its estimate. A suitable method for replacing the estimate in this aspect of the backfilling method is by updating the prediction e.g. by multiplying the current prediction by a suitable constant, such as by a factor of 10, on every miss.

c. As a similarity criterion for matching past jobs to the predicted job. User estimates are simply not used in similarity criteria lists when they are not available.

TABLE 5 illustrates two Best No-Estimate SBH Configurations and Their respective Performances Relative to RUH:

| Configuration: | Improvement over RUH, Average over all logs: | | | |
|---|---|---|---|---|
| | Wait Time | Bounded Slowdown | Absolute Inaccuracy | Relative Accuracy |
| Balanced, DFS, [PX, P, X, *] | −5% | −4% | −13% | 1% |
| Unbalanced, DFS, [PX, P, X, *] | −8% | −11% | N/A | 1% |

Table 5 and FIGS. 10A-10B present two high-performing SBH variants that do not use estimates. Neither variant uses propagation, and using it has a negligible effect. The "Balanced" variant stops the exponential growth of predictions after it hits a certain (high) threshold, while the "Unbalanced" variant does not. Not stopping the exponential growth is believed to result in better performance. However, this comes at the expense of an out-of-bounds absolute error, and also at some cost to fairness, since the high over-estimations that are inevitably created enable more backfilling of short (i.e. predicted-to-be-short) jobs, at the expense of long (i.e. predicted-to-be-long) jobs.

The empirical results show that the best configuration of SBH without user estimate is still not as good as RUH. Compared to the best SBH predictor with user estimates, the average wait time is about 10% worse, and the average absolute inaccuracy is 22% higher. Therefore, preferably, users are prompted to indicate estimates for submitted jobs even when predictors are used. However, if user estimates are not available, the above predictors are employed.

Information-Less Prediction: The problem of runtime prediction with no information is highly practical in grids and other distributed co-scheduled machines, where a single user session may be executed on several separate computers, and so the history of an incoming job may not be available to a local scheduler. The remote scheduling protocol may not even transfer original user identifiers or estimates, let alone complete histories.

Information-less predictors also are helpful in assessing the value of information that the more informed predictors enjoy, in terms of the difference in performance and accuracy between them. This can facilitate a decision as to whether collecting the extra information, which requires effort in grid-like systems, is worthwhile.

The Constant predictor, defined above, using a constant of one second, provides a very surprising result. Although it uses no information to make predictions (neither the job's user estimate, nor past jobs, nor any other attributes of the job), the Constant predictor successfully matches the performance of RUH in the wait time and absolute error metrics, and significantly outperform EASY in the two other metrics (Table 6).

| Predictor: | Improvement over EASY, Average over all logs: | | | |
| --- | --- | --- | --- | --- |
| | Wait Time | Bounded Slowdown | Absolute Inaccuracy | Relative Accuracy |
| Constant 1 Second | 16% | 13% | 41% | 37% |
| RUH with Propagation | 17% | 32% | 41% | 71% |

Accuracy may be achieved by first guessing, e.g. one second, and gradually increasing the prediction as the job runs longer. An initial low guess enables to backfill any job, regardless of its attributes—and the method indeed backfills on average 22% more jobs than EASY. However, this is not done at the expense of long jobs (since all jobs have an equal chance to backfill). Also, the gradual ascent in prediction during runtime maintains a small gap between a job's runtime and its reserved shadow time, which helps in maintaining fairness as well.

Constant values higher than 1 second produce worse results, which become far worse as the constant increases. This happens because the scheduler cannot differentiate between short and long waiting jobs (since all jobs have the same initial prediction), and it is harder to backfill waiting jobs, since they are longer and thus require longer shadow times to be able to backfill.

The methods just described are also suited to a mixed situation, in which some jobs have full historical data while others do not (as in a grid setting).

It is appreciated that the concept of user sessions is effective and valuable in both the full information case and the estimation-less case.

It is appreciated that software components of the present invention may, if desired, by implemented in ROM (read only memory) form. The software components may, generally, be implemented in hardware, if desired, using conventional techniques.

Features of the present invention which are described in the context of separate embodiments may also be provided in combination in a single embodiment. Conversely, features of the invention which are described for brevity in the context of a single embodiment may be provided separately or in any suitable subcombination.

The invention claimed is:

1. A method for performing backfilling on an incoming flow of incoming parallel programs provided by a population of clients to a facility, the method comprising:

using a computer-controlled process to generate a current run-time prediction for at least some of the incoming parallel programs;

performing backfilling on the incoming flow of incoming parallel programs based, at least in part, on at least some of the current run-time predictions and on client estimated run-times, wherein at least an individual one of the client estimated run-times is implied from an attribute of the parallel program associated with the individual client estimated run-time rather than being explicitly provided by the client; and if the current run-time of a particular incoming parallel program currently in process exceeds the current run-time prediction corresponding to the particular incoming parallel program, generating an updated run-time prediction to exceed the current run-time, re-defining the current run-time prediction to equal the updated run-time prediction, and continuing to execute said performing backfilling based on the updated run-time prediction.

2. A method according to claim 1, wherein a contract is defined between the population of clients and the facility, the contract including a condition for killing parallel programs, and wherein incoming parallel programs are killed only in accordance with the contract.

3. A method according to claim 2, wherein the condition for killing parallel programs comprises provision by a client of a run-time estimate for a parallel program which is exceeded by an actual run-time of the parallel program.

4. A method according to claim 1, wherein said performing backfilling uses historical information associated with at least one parallel program attribute.

5. A method according to claim 4, wherein the at least one parallel program attribute comprises at least one of the following attributes:

an attribute characterizing a client associated with an individual parallel program;

an attribute characterizing at least one queue to which the individual parallel program belongs;

an attribute characterizing at least one group to which the individual parallel program belongs;

an attribute characterizing the individual parallel program's origin;

an attribute characterizing the individual parallel program's resource requirements including at least one of the following requirements: runtime, or a number of processors required to execute the individual parallel program; or an attribute of at least one client request including at least one of the following client request attributes: amount of requested memory, amount of requested CPU time, amount of requested wall-clock time, identity of requested queue, identity of requested group, or identity of client.

6. A method according to claim 4, wherein the historical information comprises characterizations of historical work sessions.

7. A method according to claim 1, wherein a temporal sequence of reservations is defined in accordance with a first ordering scheme for a first plurality of waiting incoming parallel programs in the incoming flow of incoming parallel programs, and wherein said performing backfilling comprises advancing a second plurality of waiting incoming parallel programs temporally arranged in accordance with a second ordering scheme without disturbing any reservation in the temporal sequence of reservations, wherein the second ordering scheme is not the same as the first ordering scheme.

8. A method according to claim 7, wherein the second ordering scheme prioritizes shorter parallel programs.

9. A method according to claim 8, wherein the second ordering scheme comprises a shortest job backfilled first (SJBF) scheme.

10. A method according to claim 1, wherein said performing backfilling is performed without preemption.

11. A method according to claim 1, wherein said generating an updated run-time prediction comprises using a client estimate as a run-time prediction.

12. A method according to claim 1, wherein said generating an updated run-time prediction comprises using the current run-time prediction which has been exceeded by the current run-time, multiplied by a multiplicative factor.

13. A system for performing backfilling on an incoming flow of incoming parallel programs provided by a population of clients to a facility, the system comprising:
a computer-controlled prediction functionality operative to generate current run-time predictions for at least some of the incoming parallel programs;
a backfiller operative to perform backfilling on the incoming flow of incoming parallel programs based, at least in part, on some of the current run-time predictions and historical information associated with at least one of an attribute characterizing a client associated with an individual parallel program; an attribute characterizing at least one queue to which the individual parallel program belongs; an attribute characterizing at least one group to which the individual parallel program belongs; an attribute characterizing the individual parallel program's origin; an attribute characterizing the individual parallel program's resource requirements including at least one of the following requirements: runtime, or a number of processors required to execute the individual parallel program; or an attribute of at least one client request including amount of requested memory, amount of requested CPU time, amount of requested wall-clock time, identity of requested queue, identity of requested group, or identity of client; and
a prediction updater operative, if a current run-time of an incoming parallel program currently in process exceeds a current run-time prediction of the incoming parallel program, to generate an updated run-time prediction to exceed the current run-time, to re-define the current run-time prediction to equal the updated run-time prediction, thereby to allow the backfiller to continue performing backfilling based on the updated run-time prediction.

14. A system according to claim 13, wherein the backfiller is operative to perform backfilling based, at least in part, on client estimated run-times if no history is associated with the client, or the current run-time prediction is exceeded by the corresponding current run-time.

15. A system according to claim 13, wherein the backfiller is operative to perform backfilling without resort to client estimated run-times.

16. A system according to claim 15 further configured to generate a run-time prediction for an individual parallel program using history relevant to the individual parallel program if such exists, and otherwise using at least one of the following information types to generate a run-time prediction:
an average run-time value;
a constant; or
a maximum allowed run-time value.

17. A system according to claim 15, wherein the backfiller is operative to perform backfilling based, at least in part, on run-time predictions based on central tendencies of runtimes of previously submitted parallel programs.

18. A system according to claim 13, wherein the backfiller is operative to perform backfilling based, at least in part, on user estimates.

19. A system according to claim 13, wherein the backfiller is operative to perform backfilling which does not resort to user estimates.

20. A system according to claim 19, wherein the backfiller is operative to perform information-less backfilling.

21. A system according to claim 13, wherein a contract is defined between the population of clients and the facility, the contract including a condition for killing parallel programs, and wherein incoming parallel programs are killed only in accordance with the contract.

22. A system according to claim 21, wherein the condition for killing parallel programs comprises provision by a client of a run-time estimate for a parallel program which is exceeded by an actual run-time of the parallel program.

23. A system according to claim 13, wherein a temporal sequence of reservations is defined in accordance with a first ordering scheme for a first plurality of waiting incoming parallel programs in the incoming flow of incoming parallel programs, and wherein said performing backfilling comprises advancing a second plurality of waiting incoming parallel programs temporally arranged in accordance with a second ordering scheme without disturbing any reservation in the temporal sequence of reservations, wherein the second ordering scheme is not the same as the first ordering scheme.

24. A system according to claim 13, wherein the backfiller is operative to perform backfilling without preemption.

25. A method for performing backfilling on an incoming flow of incoming parallel programs provided by a population of clients to a facility, the method comprising:
using a computer-controlled process to generate a current run-time prediction for at least some of the incoming parallel programs;
using a prediction updater to, if a current run-time of a parallel program currently in process exceeds the current run-time prediction of a particular incoming parallel program, update the current run-time prediction to exceed the current run-time and to re-define the current run-time prediction to equal the updated run-time prediction; and
performing backfilling on the incoming flow of incoming parallel programs based, at least in part, on some of the current run-time predictions and updated run-time predictions, including prioritizing shorter parallel programs from among the incoming parallel programs.

26. A system for performing backfilling on an incoming flow of incoming parallel programs provided by a population of clients to a facility, the system comprising:
a computer-controlled process operative to generate a current run-time prediction for at least some of the incoming parallel programs,
a prediction updater operative, if a current run-time of a particular parallel program currently in process exceeds the current run-time prediction of the particular parallel program, to generate an updated run-time prediction to exceed the current run-time and to re-define the current run-time prediction to equal the updated run-time prediction; and
a backfiller including a processor configured to perform backfilling on the incoming flow of incoming parallel programs based, at least in part, on some of the current run-time predictions and updated run-time predictions, the backfiller being operative to prioritize shorter parallel programs from among the incoming parallel programs.

27. A system according to any of claims 26, wherein the backfiller is operative to perform history-based backfilling.

28. A system according to claim 27, wherein the history-based backfilling gives precedence to recent history.

29. A system according to claim 27, wherein the history-based backfilling gives precedence to similar history.

30. A system according to claim 26, wherein the backfiller is operative to employ information characterizing at least one user session.

31. A system for performing backfilling on an incoming flow of incoming parallel programs provided by a population of clients to a facility, wherein the system includes a processor, the system comprising:

a reservation generator operative to generate a temporal sequence of reservations defined in accordance with a first ordering scheme for a first plurality of waiting incoming parallel programs in the incoming flow; and a backfiller operative to advance a second plurality of waiting incoming parallel programs in the incoming flow without disturbing any reservation in the temporal sequence of reservations, wherein advancing takes place in accordance with a second ordering scheme of the second plurality of waiting incoming parallel programs, wherein the second ordering scheme is based, at least in part, on current run-time predictions and updated run-time predictions, wherein the updated run-time predictions are updated to exceed the current run-time predictions if a run-time of a parallel program currently in process exceeds the current run-time prediction of the parallel program, and wherein the current runtime prediction is re-defined to equal the updated run-time prediction if the run-time of the parallel program exceeds the current run-time prediction, and wherein the second ordering prioritizes shorter parallel programs from among the second plurality of waiting incoming parallel programs.

32. A method for performing backfilling on an incoming flow of incoming parallel programs provided by a population of clients to a facility, the method comprising:

generating a temporal sequence of reservations defined in accordance with a first ordering scheme for a first plurality of waiting incoming parallel programs in the incoming flow; and advancing a second plurality of waiting incoming parallel programs in the incoming flow without disturbing any reservation in the temporal sequence of reservations, wherein said advancing takes place in accordance with a second ordering scheme of the second plurality of waiting incoming parallel programs, wherein the second ordering scheme is based, at least in part, on system-generated run-time predictions and updated run-time predictions, wherein the updated run-time predictions are updated to exceed the system-generated run-time predictions if a run-time of a particular program currently in process exceeds the system-generated run-time prediction of the particular program, and wherein the system-generated runtime prediction is re-defined to equal the updated run-time prediction if the run-time of the particular program exceeds the system-generated run-time prediction, and wherein the second ordering scheme prioritizes shorter parallel programs from among the second plurality of waiting incoming parallel programs.

* * * * *

UNITED STATES PATENT AND TRADEMARK OFFICE
CERTIFICATE OF CORRECTION

PATENT NO. : 8,261,283 B2  
APPLICATION NO. : 11/884024  
DATED : September 4, 2012  
INVENTOR(S) : Tsafrir et al.

Page 1 of 1

It is certified that error appears in the above-identified patent and that said Letters Patent is hereby corrected as shown below:

On the Title Page, in item (73), under "Assignee", in Column 1, Line 2, delete "Yissum Research Development Company of Hebrew University of Jerusalem" and insert -- Yissum Research Development Company of the Hebrew University of Jerusalem --, therefor.

Signed and Sealed this  
Fifth Day of February, 2013

Teresa Stanek Rea  
*Acting Director of the United States Patent and Trademark Office*